United States Patent
Takahashi

(10) Patent No.: US 9,285,514 B2
(45) Date of Patent: Mar. 15, 2016

(54) IMAGE DISPLAY APPARATUS HAVING A PRISM OPTICAL SYSTEM INCLUDING A PLURALITY OF ROTATIONALLY ASYMMETRIC SURFACES

(71) Applicant: OLYMPUS CORPORATION, Tokyo (JP)

(72) Inventor: Koichi Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 506 days.

(21) Appl. No.: 13/750,281

(22) Filed: Jan. 25, 2013

(65) Prior Publication Data
US 2013/0134301 A1 May 30, 2013

Related U.S. Application Data

(63) Continuation of application No. PCT/JP2011/001879, filed on Mar. 29, 2011.

(30) Foreign Application Priority Data

Jul. 27, 2010 (JP) .................. 2010-167790

(51) Int. Cl.
*G03B 21/14* (2006.01)
*G02B 5/04* (2006.01)
(Continued)

(52) U.S. Cl.
CPC ... *G02B 5/04* (2013.01); *G01J 1/04* (2013.01); *G01J 1/0477* (2013.01); *G02B 17/04* (2013.01); *G02B 17/086* (2013.01); *G02B 27/0172* (2013.01); *G03B 21/208* (2013.01); *G03B 21/2066* (2013.01); *G03B 21/28* (2013.01); *G02B 2027/011* (2013.01)

(58) Field of Classification Search
CPC .... G03B 21/00; G03B 21/20; G03B 21/2066; G03B 21/208; G03B 21/28; G02B 5/04; G02B 17/04; G02B 17/086; G02B 27/0172; G02B 2027/011; G01J 1/04; G01J 1/0477
USPC ................................................. 359/834, 837
See application file for complete search history.

(56) References Cited

U.S. PATENT DOCUMENTS 5,909,325 A * 6/1999 Kuba et al. ..................... 359/834
6,094,315 A * 7/2000 Aoki ............................. 359/731
(Continued)

FOREIGN PATENT DOCUMENTS

JP 10-333042 12/1998
JP 2001-264681 9/2001
(Continued)

OTHER PUBLICATIONS

International Search Report dated Jul. 5, 2011 issued in PCT/JP2011/001879.

*Primary Examiner* — Sultan Chowdhury
*Assistant Examiner* — Magda Cruz
(74) *Attorney, Agent, or Firm* — Scully, Scott, Murphy & Presser, PC

(57) ABSTRACT

A prism optical system including at least four optical surfaces, each having optical functions. At least two of the four optical surfaces are each a rotationally asymmetric surface, and one of two surfaces on which light is incident or from which light exits out is capable of one transmission and two internal reflections.

15 Claims, 19 Drawing Sheets

(51) Int. Cl.
  *G03B 21/20* (2006.01)
  *G03B 21/28* (2006.01)
  *G02B 17/04* (2006.01)
  *G01J 1/04* (2006.01)
  *G02B 17/08* (2006.01)
  *G02B 27/01* (2006.01)

(56) References Cited

U.S. PATENT DOCUMENTS

| | | | |
|---|---|---|---|
| 6,426,841 B1 * | 7/2002 | Araki et al. | 359/834 |
| 6,522,475 B2 * | 2/2003 | Akiyama et al. | 359/676 |
| 6,636,356 B2 * | 10/2003 | Takeyama | 359/565 |
| 7,224,501 B2 * | 5/2007 | Kojima | 359/16 |
| 7,570,438 B2 * | 8/2009 | McKinley | 359/726 |
| 8,638,483 B2 * | 1/2014 | Yamada et al. | 359/13 |
| 8,913,325 B2 * | 12/2014 | Takahashi | 359/631 |
| 2001/0022689 A1 * | 9/2001 | Takeyama | 359/625 |
| 2005/0046952 A1 * | 3/2005 | Nagata | G02B 13/007 359/627 |
| 2005/0206985 A1 * | 9/2005 | Togino | G02B 27/0101 359/15 |
| 2005/0254107 A1 | 11/2005 | Amanai | |
| 2014/0267636 A1 * | 9/2014 | Takagi et al. | 348/53 |

FOREIGN PATENT DOCUMENTS

| | | |
|---|---|---|
| JP | 2003-021805 | 1/2003 |
| JP | 2004-325985 | 11/2004 |
| JP | 2005-62803 | 3/2005 |
| JP | 2005-202060 | 7/2005 |
| JP | 2006-003879 | 1/2006 |
| JP | 2007-094175 | 4/2007 |
| JP | 2008-076429 | 4/2008 |

* cited by examiner

IMAGE DISPLAY APPARATUS HAVING A PRISM OPTICAL SYSTEM INCLUDING A PLURALITY OF ROTATIONALLY ASYMMETRIC SURFACES

BACKGROUND OF THE INVENTION

The present invention relates to a prism optical system using a rotationally asymmetric surface, and an image display apparatus and imaging apparatus incorporating the prism optical system.

Being composed typically of a plurality of optical surfaces, a prism optical system has been used as an optical system for viewing an image display device, wherein light emanating out of the display device enters the prism, and emits out from the prism after reflection inside, arriving at the eyeball of a viewer so that images can be viewed as enlarged virtual images. In this regard, there are prior arts, for instance, Patent Publication 1 showing a prism wherein the primary image is formed by at least three reflecting surfaces for projection onto the eyeball, and Patent Publications 1, 2 and 3 showing a hologram device located at an eyeglasses lens portion.

There has also been another prism optical system proposed in the art inclusive of an optical system comprising a cylindrical prism of parallelogram shape positioned in front of the viewer s eyeball for multi-reflections and an eyepiece lens for projection of an image onto the eyeball, and an optical system comprising a combined photoguide and eyepiece lens for projection of an image onto the eyeball (Patent Publications 4 and 5).

SUMMARY OF THE INVENTION

The prism optical system according to this embodiment of the invention comprises at least four optical surfaces, each having optical functions, wherein at least two of the four optical surfaces are each a rotationally asymmetric surface, and one of two surfaces on which light is incident and from which light exits out is capable of one transmission and two internal reflections.

The aforesaid prism optical system may also comprise five optical surfaces, each having optical functions, wherein at least two of the five optical surfaces are each a rotationally asymmetric surface, and one of two surfaces on which light is incident or from which light exits out is capable of one transmission and two internal reflections.

In order along a path taken by light from incidence on the prism optical system until light exits out from the prism optical system, the prism optical system is made up of the first surface that is a combined entrance and transmission surface, the second surface that is an internal reflection surface located in opposition to the first surface, the third surface that is a combined internal reflection and transmission surface located in opposition to the second surface, the fourth surface that is an internal reflection surface located in opposition to the third surface and adjacent to the second surface, and the fifth surface that is an internal reflection surface located adjacent to the fourth surface and in opposition to the third surface.

Total reflection is used for at least one internal reflection at the third surface.

In the prism optical system of the invention, the third surface is a rotationally asymmetric surface.

In the prism optical system of the invention, the third surface has negative power in a plane including a center chief ray.

In the prism optical system of the invention, the fourth surface is a rotationally asymmetric surface.

In the prism optical system of the invention, the fifth surface is a rotationally asymmetric surface.

In the prism optical system of the invention, the fifth surface has positive power in a plane including a center chief ray.

In the prism optical system of the invention, the second surface is a rotationally asymmetric surface.

The image display apparatus according to the instant embodiment of the invention comprises an image display device located in opposition to the first surface of the prism optical system, wherein the eyeball of a viewer is positioned in opposition to the transmitting area of the third surface so that enlarged virtual images can be presented to the viewer.

An exit pupil is formed near to the third surface of the prism optical system or between the third surface and the viewer s eyeball.

The imaging apparatus of the invention comprises an imaging device located in opposition to the first surface of the prism optical system and an aperture stop located in front of and near to the transmitting area of the third surface to take images in the outside world.

Still other objects and advantages of the invention will in part be obvious and will in part be apparent form the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
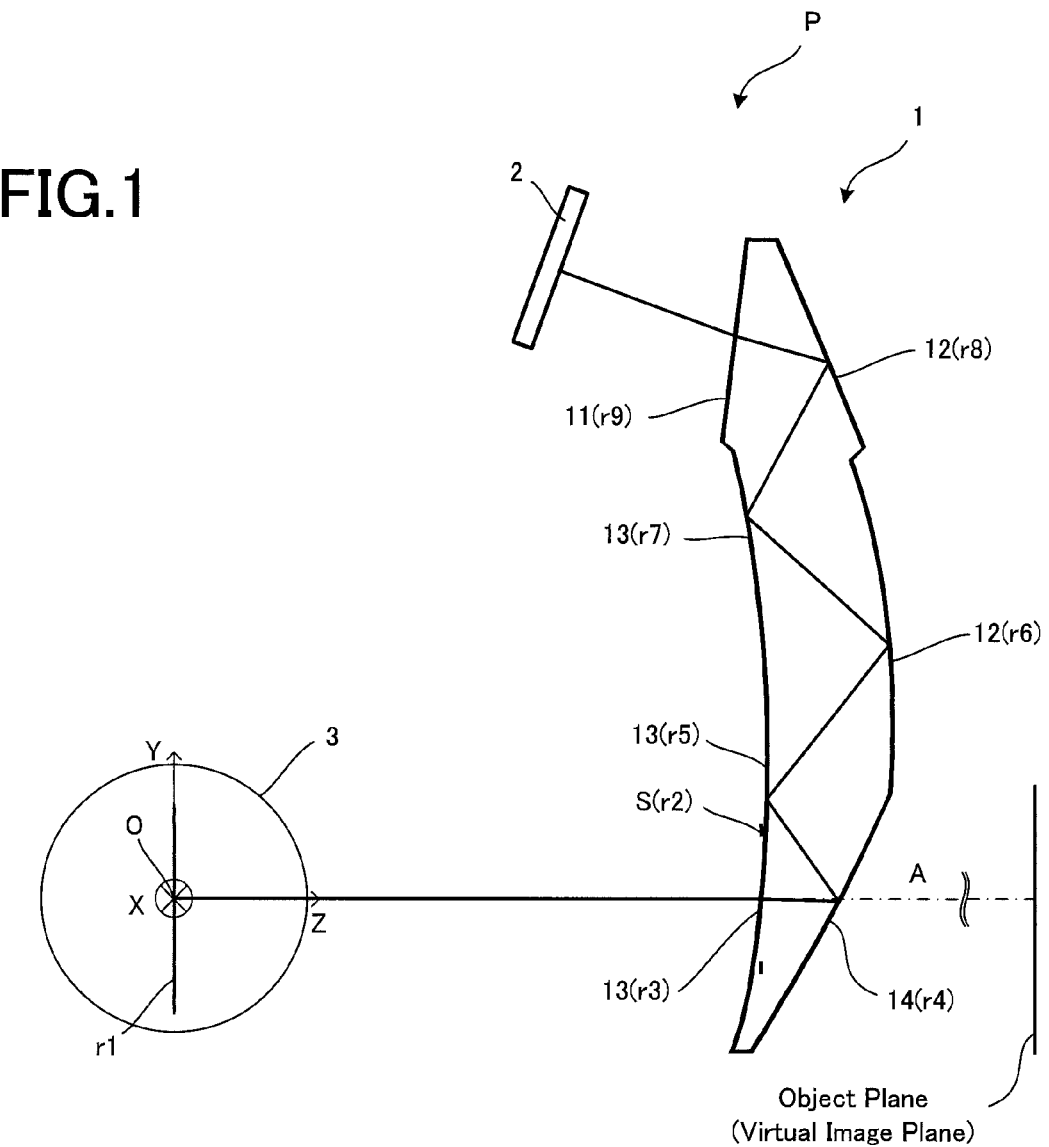
FIG. 1 is illustrative in construction of the prism optical system according to the first embodiment of the invention.

Preferably, the optical system according to one embodiment of the invention, shown generally by 1, uses at least four optical surfaces, each having optical functions, wherein at least two t of the four optical surfaces are each a rotationally asymmetric surface, and one of two surfaces on which light is incident or from which light exits out is capable of one transmission and two internal reflections.

Such arrangement enables the prism optical system 1 comprising four optical surfaces to make effective use of their optical functions, and an image on the image display device 2 to be multi-reflected for guidance into the eyeball of a viewer, so that there can be an increased degree of flexibility in selecting the shape of the prism optical system 1, and the relative positions of the image display device 2 and the exit pupil S, and the angles of incidence and exit of light rays can be set as desired. The surface on which light is incident or from which light exits out is here understood to refer to a surface that, when used for the display apparatus P, acts as an exit surface and when used for an imaging apparatus (not shown), acts as a combined entrance and exit surface having transmission. By making that surface capable of internal reflection at the same time, its transmitting area can overlap its reflecting area inside the prism optical system 1, and further by allowing for two internal reflections, two reflections can take place at the single surface so that two reflecting areas can overlap each other while the surface-to-surface seam is left unnoticed. In other words, the prism itself can be made more compact, working in favor of reducing the size and weight of the apparatus.

As a result, the prism optical device can be in a more compact form, easing the wearer of discomforts and troublesomeness as it is used for the image display apparatus P, and contributing to reductions in the size and weight of the whole apparatus as it is used for the imaging apparatus.

For the prism optical system 1, it is also preferable to use at least five optical surfaces, each having optical functions, wherein at least two of the five optical surfaces are each a rotationally asymmetric surface, and one of two surfaces on which light is incident or from which light exits out is capable of one transmission and two internal reflections.

Such arrangement includes one surface too many as compared with the prism optical system comprising four optical surfaces so that its optical functions can be more effectively used. In addition, there are three reflecting surfaces on the side of the arrangement opposing to the entrance surface, each one surface capable of one reflection. This makes it easier to gain control of reflection direction, resulting in an increased degree of flexibility in selecting the shape of the prism optical system 1, and enabling the relative positions of the image display device 2 and exit pupil S and the angles of incidence and exit of light rays to be set as desired. It is thus possible to boost up the performance of the prism optical system 1 and make it more compact by itself, working in favor of size and light reductions of the apparatus.

In order along a path taken by light from incidence on the prism optical system 1 until light exits out from the prism optical system 1, it is preferable for the prism optical system 1 to be made up of the first surface 11 that is a combined entrance and transmission surface, the second surface 12 that is an internal reflection surface positioned in opposition to the first surface 11, the third surface 13 that is a combined internal reflection and transmission surface positioned in opposition to the second surface 12, the fourth surface 14 that is an internal reflection surface positioned in opposition to the third surface 13 and adjacent to the second surface 12, and the fifth surface 15 that is an internal reflection surface positioned adjacent to the fourth surface 14 and in opposition to the third surface 13.

According to the prism optical system 1 made up of such optical surfaces, the third surface 13 is positioned in opposition to the second 12, the fourth 14 and the fifth surface 15, in which case there are multi-reflections taking place inside the left and right surfaces in the prism. This in turn enables the prism optical system 1 to have an ever longer optical path albeit being a very small prism optical device. The prism has also a substantially rod-like shape having curved surfaces, so that it can be configured in conformity to the contour shape of the eyeglasses to be described later. In addition, the prism optical system 1 may also be used as part of eyeglasses frames.

When such image display apparatus comprising the substantially rod-like, small prism optical device is located in front of the viewer s eyeball, it is thus possible to diminish an area standing in the way to the viewer s outside world field of view.

Further in the prism optical system 1, there are two internal reflections occurring at the third surface 13, before and after which there are internal reflections occurring at the second 12, the fourth 14 and the fifth surface 15, making it possible to locate the image display device 2 at the desired angle by setting the second surface 12 at a proper angle of tilt. It is also possible to set the viewer s eyeball in the desired position at the desired angle by setting the fifth surface 15 at a proper angle of tilt. With the prism optical system 1 of such arrangement, the image display device 2 may be located in a relative position at a relative angle with some flexibility while it does not stand in the way to the viewer.

As a result, it is possible for the user to implement see-through viewing with no blind spot, so that the user can put on the prism optical system unobtrusively and more comfortably. In addition, the high degree of flexibility in shape enables the inventive prism optical system 1 to be used as part of eyeglasses frames, and those who put on the image display apparatus P may look objectively quite natural.

Preferably, at least one reflection at the third surface 13 is total reflection.

By allowing the internal reflection at the first surface to occur in the form of total reflection, the first surface is capable of internal reflection without having a reflection coating on it. When the third surface 13 is used as the entrance or exit surface, there is no need for counting on special means such as half-mirror coating or HOE because the area capable of total reflection is transparent to light. In addition, that total reflection makes sure virtually almost 100% reflectivity higher than that of a metal coat, holding back reductions in the whole efficiency.

This would result in the prism optical system 1 being fabricated at lower costs because of no need for special coating or the like. In addition, the high reflectivity would make sure the apparatus has high efficiency and is able to be energy efficient as well.

For the prism optical system 1, it is also preferable that the third surface 13 is a rotationally asymmetric surface.

Acting as a transmission surface and being capable of two internal reflections, the third surface 13 makes sure some considerable effects on correction of aberrations upon transmission and reflection.

There can be images obtained with well corrected aberrations. Accordingly, when the inventive prism optical system is used as the image display apparatus P, it is possible for the viewer to view less distorted, clearer images. When it is used as an imaging apparatus, too, it is possible to take less distorted images of higher resolutions.

For the prism optical system 1, it is preferable that the third surface 13 has negative power in a plane including a center chief ray.

The third surface 13 is capable of two internal reflections that are preferably total reflections. Referring here to the total reflection condition, the angle of incidence at the point of reflection must be greater than the critical angle. The critical angle θc is given by θc=arcsin (1/n) where n is the refractive index of the vitreous material of the prism. For instance, when n=1.5, then θc=41.81°. If the angle of incidence on the third surface 13 is greater than 41.81°, then there is total reflection occurring. However, if the third surface 13 has positive power, then the normal to that surface turns in the direction of incident light coming from obliquely above. In turn, the angle of incidence is likely to become small, rendering it difficult for all light beams to have an angle of incidence greater than the critical angle. However, if, in the YZ plane including the center chief ray A, the third surface 13 has negative power or it is convex with respect to the incident light, then the angle of incidence of all light beams tends to grow large, resulting in effective satisfaction of the total reflection condition.

As a consequence, the prism optical system 1 could be fabricated at lower costs because there is no need for special coating or the like other than ordinary reflection coating. In addition, total reflection makes sure reflectivity higher than could be achieved with reflective coating, resulting in the achievement of an efficient, energy-saving apparatus.

For the prism optical system 1, it is preferable that the fourth surface 14 is a rotationally asymmetric surface.

The fourth surface 14 is capable of internal reflection, and positioned in an intermediate position of the prism optical system 1; that is, each of light beams is going to have a relatively large sectional area due to negative power from the transmission and internal reflection of the third surface 13, resulting in a great likelihood of spherical aberrations and coma occurring from the decentration of that surface upon reflection. Prevention of such decentration aberrations from growing large is desirous for boosting up the performance of the whole prism optical system 1.

As a result, there can be images obtained with well corrected aberrations. Accordingly, when the inventive prism optical system is used as the image display apparatus P, it is possible for the viewer to view less distorted, clearer images. When it is used as an imaging apparatus, too, it is possible to take less distorted images of higher resolutions.

For the prism optical system 1, it is preferable that the fifth surface 15 is a rotationally asymmetric surface.

The fifth surface 15 acts as an internal reflection surface. Suppose now that the prism optical system is used as an imaging apparatus. For the reason that the fifth surface 15 is positioned just after the entrance pupil and entrance surface of the optical system, light beams with varying angles of incidence are almost the same and relatively large, so much that coma is likely to occur from the decentration (tilting) of that surface. Correction of decentration aberrations by the surface that causes them or prevention of decentration aberrations from growing large is desirous for boosting up the performance of the whole optical system.

As a result, there can be images obtained with well corrected aberrations. Accordingly, when the inventive prism optical system is used as the image display apparatus P, it is possible for the viewer to view less distorted, clearer images. When it is used as an imaging apparatus, too, it is possible to take less distorted images of higher resolutions.

For the prism optical system 1, it is preferable that the fifth surface has positive power within a plane including a center chief ray.

The fifth surface 15 is preferably a surface that has positive power contributing to internal reflection in the YZ plane including the center chief ray. If the third surface 13 has negative power, then any one or some of the first 11, the second 12, the fourth 14 and the fifth surface 15 must have positive power for the purpose of setting up the optical system as an imaging system. Suppose now that parallel light enters the optical system from the exit pupil to form an image plane. If the fifth surface 15 has positive power, then the prism optical system 1 will have a power profile comprising, in order from the object side toward the image plane, negative, positive, negative, (positive, negative or zero) and negative, and make sure the incident light turns from negative power to positive power just upon entrance, resulting in the ability of turning the power of the whole prism optical system 1 to positive.

As a result, there can be images obtained with well corrected aberrations. Accordingly, when the inventive prism optical system is used as the image display apparatus P, it is possible for the viewer to view less distorted, clearer images. When it is used as an imaging apparatus, too, it is possible to take less distorted images of high resolutions.

For the prism optical system 1, it is preferable that the second surface 12 is a rotationally asymmetric surface.

The second surface 12 is an internal reflection surface that is positioned near to the image plane of the prism optical system 1, placing light beams into a relatively small state. Application of the rotationally asymmetric surface to that surface works in favor of correction of off-axis aberrations in general, and distortion in particular when there is a large angle of view.

As a result, there can be images obtained with well corrected aberrations. Accordingly, when the inventive prism optical system is used as the image display apparatus P, it is possible for the viewer to view less distorted, clearer images. When it is used as an imaging apparatus, too, it is possible to take less distorted images of higher resolutions.

For the image display apparatus P disclosed herein, it is preferable that the image display device 2 is located in opposition to the first surface 11 of the prism optical system 1, and the viewer s eye is located in opposition to the transmitting area of the third surface 13, so that enlarged virtual images can be presented to the viewer.

Light emanating from the image display device 2 enters the prism optical system 1 from the first surface 11, and is then internally reflected five times at the second 12, the third 13, the fourth 14, the third 13, and the fifth surface 15, exiting out from the third surface 13 as substantial parallel light and entering the viewer s eyeball.

With the image display apparatus P set up as described above, it is possible for the viewer to view enlarged virtual images.

For the image display device 2, it is preferable that the exit pupil is formed near the exit window of the third surface 13 of the prism optical system 1 or between the third surface 13 and the viewer s eyeball.

As the exit pupil of the image display device 2 is located near to the exit window of the third surface 13 of the prism optical system 1 or interposed between the third surface 13 and the viewer s eyeball, it helps reduce shadings of light beams on the periphery of an image under observation.

With the image display apparatus set up as described above, it is possible for the viewer to view clear images as far as the periphery of the screen.

In the imaging apparatus of the invention not shown, an imaging device is located in opposition to the first surface 11 of the prism optical system 1, and an aperture stop is located in front of and near the transmitting area of the third surface 13 thereby taking images in the outside world.

As the aperture stop having a circular aperture is located below and near the third surface 13 of the prism optical system 1 and the imaging device such as a CCD is located in opposition to the first surface 11, it allows light incident from the third surface 13 of the prism through the aperture stop to be internally reflected five times at the fifth 15, the third 13, the fourth 14, the third 13, and the second surface 12, arriving at the imaging device through the first surface 11 for light collection.

It is thus possible to achieve an imaging apparatus that is reduced in terms of size and weight.

The prism optical system 1 here will now be explained with reference to specific examples.

Figure 10:
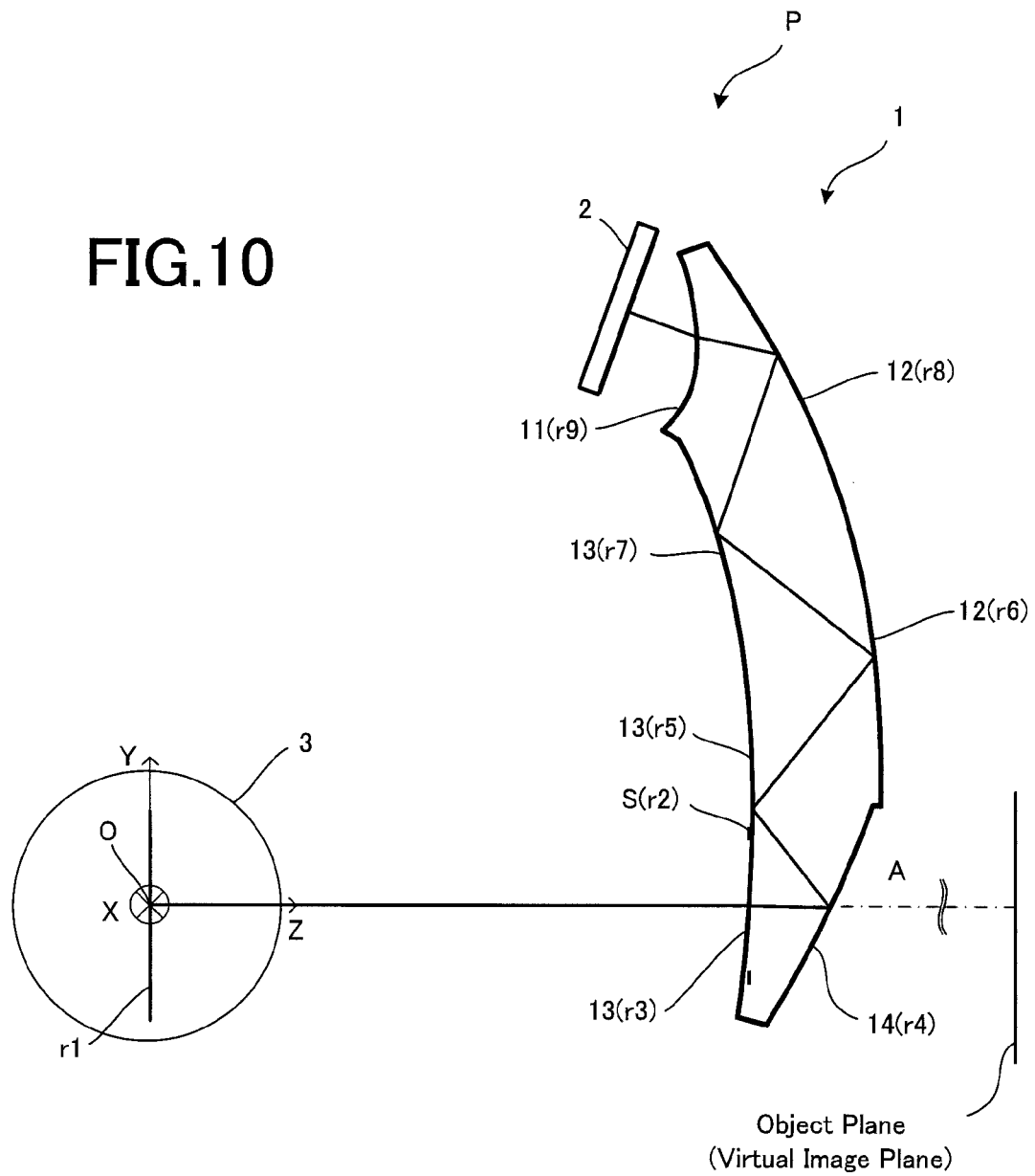
FIG. 10 is illustrative in construction of the prism optical system according to the second embodiment of the invention.

Specific constituting parameters of the prism optical system 1, given later, have been determined on the basis of the results of back ray tracing wherein, as shown in FIGS. 1 and 10, a light ray through an object plane of the prism optical system 1 in back ray tracing defined by a viewing position taken by the viewer goes through the prism optical system 1 toward the image display device 2.

Referring to the coordinate system here, as depicted in FIGS. 1 and 10, the point of intersection of the object plane with the center chief ray A is defined as the origin O. Then, a direction of the center chief ray from the origin O toward the prism optical system 1 side is defined as the Z-axis positive direction, the direction orthogonal to the Z-axis on the image display device 2 side from the origin O is defined as the Y-axis positive direction; and the sheet plane of FIGS. 1 and 10 is defined as the Y-Z plane. Then, an axis that forms a right-handed orthogonal coordinate system with the Y- and Z-axes is defined as the X-axis positive direction.

Given to each decentered surface are the amount of decentration of the coordinate system—on which that surface is defined—from the center of the origin of the optical system (X, Y and Z in the X-, Y- and Z-axis directions) and the angles ($\alpha$, $\beta$, $\gamma$ (°)) of tilt of the coordinate system for defining each surface about the X-, Y- and Z-axes of the coordinate system defined on the origin of the optical system. In that case, the positive $\alpha$ and $\beta$ mean counterclockwise rotation with respect to the positive directions of the respective axes, and the positive $\gamma$ means clockwise rotation with respect to the positive direction of the Z-axis. Referring to the $\alpha$, $\beta$, $\gamma$ rotation of the center axis of a certain surface, the coordinate system for defining each surface is first a rotated counterclockwise about the X-axis of the coordinate system defined on the origin of the coordinate system. Then, it is $\beta$ rotated counterclockwise about the Y-axis of the thus rotated, new coordinate system, and finally $\gamma$ rotated clockwise about the Z-axis of the thus rotated, new another coordinate system.

When a specific surface of the optical function surfaces forming the optical system of each example and the subsequent surface form together a coaxial optical system, there is a surface separation given. Besides, the radii of curvature of the surfaces, and the refractive indices and Abbe constants of the media are given as usual.

It is also noted that coefficient terms to which no data are given in the following constituting parameters are zero. The refractive indices and Abbe constants on a d-line basis (587.56 nm wavelength) are given, and length is given in mm. The decentration of each surface is represented by the quantity of decentration from the reference surface, as mentioned above.

The surface shape of the free-form surface used in the embodiments of the invention is defined by the following formula (a). Suppose here that the Z-axis of that defining formula is the axis of the free-form surface.

$$Z = (r^2/R)/\left[1 + \sqrt{\{1-(1+k)(r/R)^2\}}\right] + \sum_{j=1}^{\infty} C_j X^m Y^n \qquad (a)$$

Here the first terms of Formula (a) is the spherical term, and the second term is the free-form surface term.

In the spherical term,
R is the radius of curvature of the vertex,
k is the conic constant, and
r is $\sqrt{(X^2+Y^2)}$.
The free-form surface term is:

$$\sum_{j=1}^{66} C_j X^m Y^n = C_1 + C_2 X + C_3 Y + C_4 X^2 + C_5 XY + C_6 Y^2 + C_7 X^3 +$$
$$C_8 X^2 Y + C_9 XY^2 + C_{10} Y^3 + C_{11} X^4 + C_{12} X^3 Y + C_{13} X^2 Y^2 +$$
$$C_{14} XY^3 + C_{15} Y^4 + C_{16} X^5 + C_{17} X^4 Y + C_{18} X^3 Y^2 + C_{19} X^2 Y^3 +$$
$$C_{20} XY^4 + C_{21} Y^5 + C_{22} X^6 + C_{23} X^5 Y + C_{24} X^4 Y^2 + C_{25} X^3 Y^3 +$$
$$C_{26} X^2 Y^4 + C_{27} XY^5 + C_{28} Y^6 + C_{29} X^7 + C_{30} X^6 Y + C_{31} X^5 Y^2 +$$
$$C_{32} X^4 Y^3 + C_{33} X^3 Y^4 + C_{34} X^2 Y^5 + C_{35} XY^6 + C_{36} Y^7 \ldots$$

where $C_j$ (j is an integer of 1 or greater) is a coefficient.

In general, that free-form surface has no plane of symmetry in both the X-Z plane and the Y-Z plane. However, by bringing all the odd-numbered degree terms with respect to X down to zero, the free-form surface can have only one plane of symmetry parallel with the Y-Z plane. For instance, this may be achieved by bringing down to zero the coefficients for the terms $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... in the above defining formula (a).

By bringing all the odd-numbered terms with respect to Y down to zero, the free-form surface can have only one plane of symmetry parallel with the X-Z plane. For instance, this may be achieved by bringing down to zero the coefficients for the terms $C_3$, $C_5$, $C_8$, $C_{10}$, $C_{12}$, $C_{14}$, $C_{17}$, $C_{19}$, $C_{21}$, $C_{23}$, $C_{25}$, $C_{27}$, $C_{30}$, $C_{32}$, $C_{34}$, $C_{36}$, ... in the above defining formula.

If any one of the directions of the aforesaid plane of symmetry is used as the plane of symmetry and decentration is implemented in a direction corresponding to that, for instance, the direction of decentraton of the optical system with respect to the plane of symmetry parallel with the Y-Z plane is set in the Y-axis direction and the direction of decentration of the optical system with respect to the plane of symmetry parallel with the X-Z plane is set in the X-axis direction, it is then possible to improve productivity while, at the same time, making effective correction of rotationally asymmetric aberrations occurring from decentration.

The aforesaid defining formula (a) is given for the sake of illustration alone as mentioned above: the feature of the invention is that by use of the rotationally asymmetric surface having only one plane of symmetry, it is possible to correct rotationally asymmetric aberrations occurring from decentration while, at the same time, improving productivity. It goes without saying that the same advantages are achievable even with any other defining formulae.

FIG. 1 is illustrative in conception of the image display apparatus P incorporating the prism optical system 1 according to the first embodiment.

As depicted in FIG. 1, the prism optical system 1 according to the first embodiment comprises five optical surfaces, each having optical functions. At least three of five such surfaces are each a rotationally asymmetric surface, and one of two surfaces on which light is incident or from which light exits out is capable of one transmission and two internal reflections.

In the image display apparatus P, the image display device 2 is located in opposition to the first surface 11 of the prism optical system 1 that is the entrance surface on which light is incident, and the viewer s eyeball 3 is located in opposition to the third surface 13 that functions as the transmitting area of the surface from which light exits out, so that enlarged virtual images can be presented to the viewer.

Then, Examples 1 and 2 of the first embodiment will now be explained.

Figure 2:
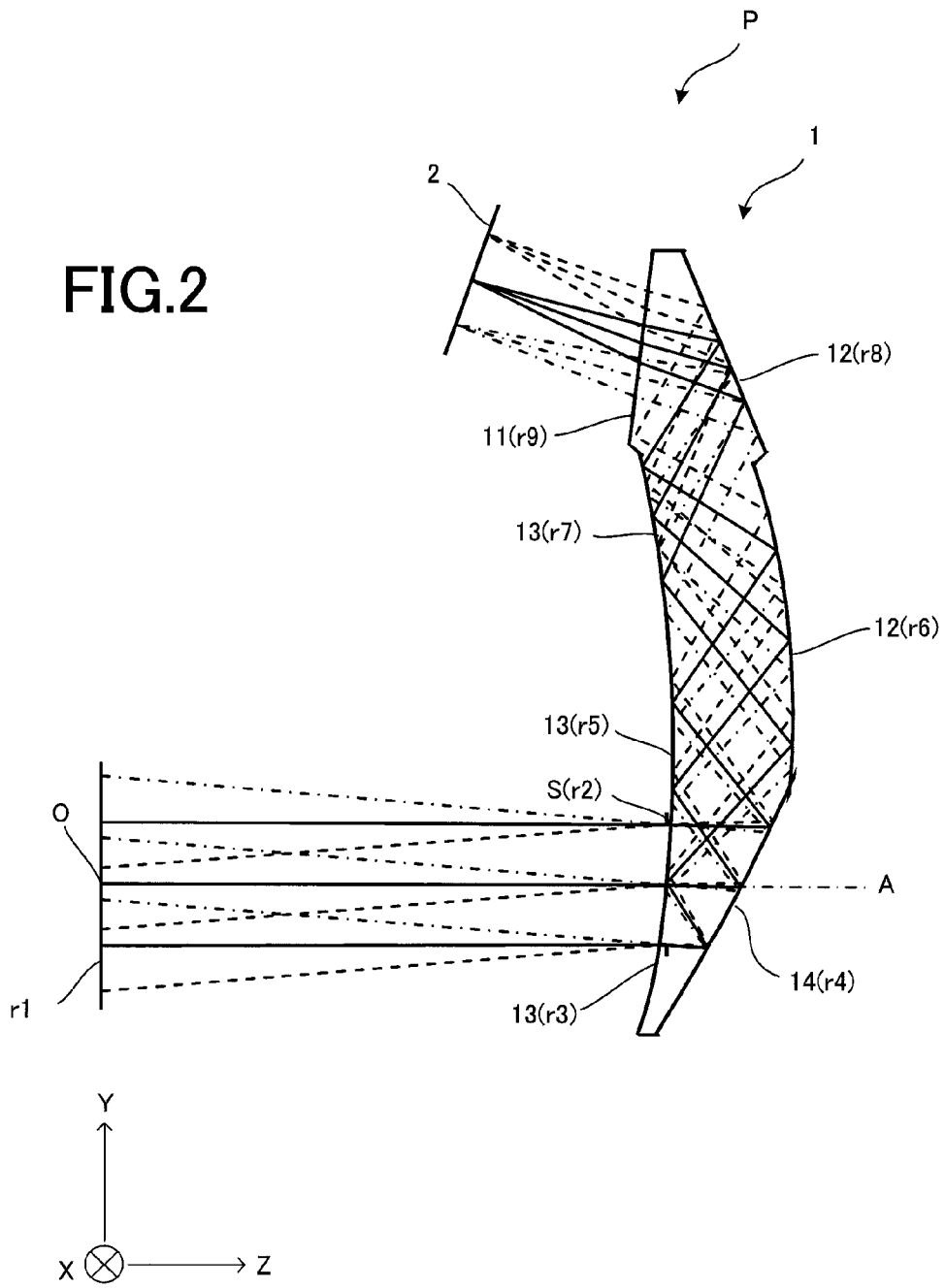
FIG. 2 is an optical path diagram in the Y-Z section of Example 1 of the prism optical system.
Figure 3:
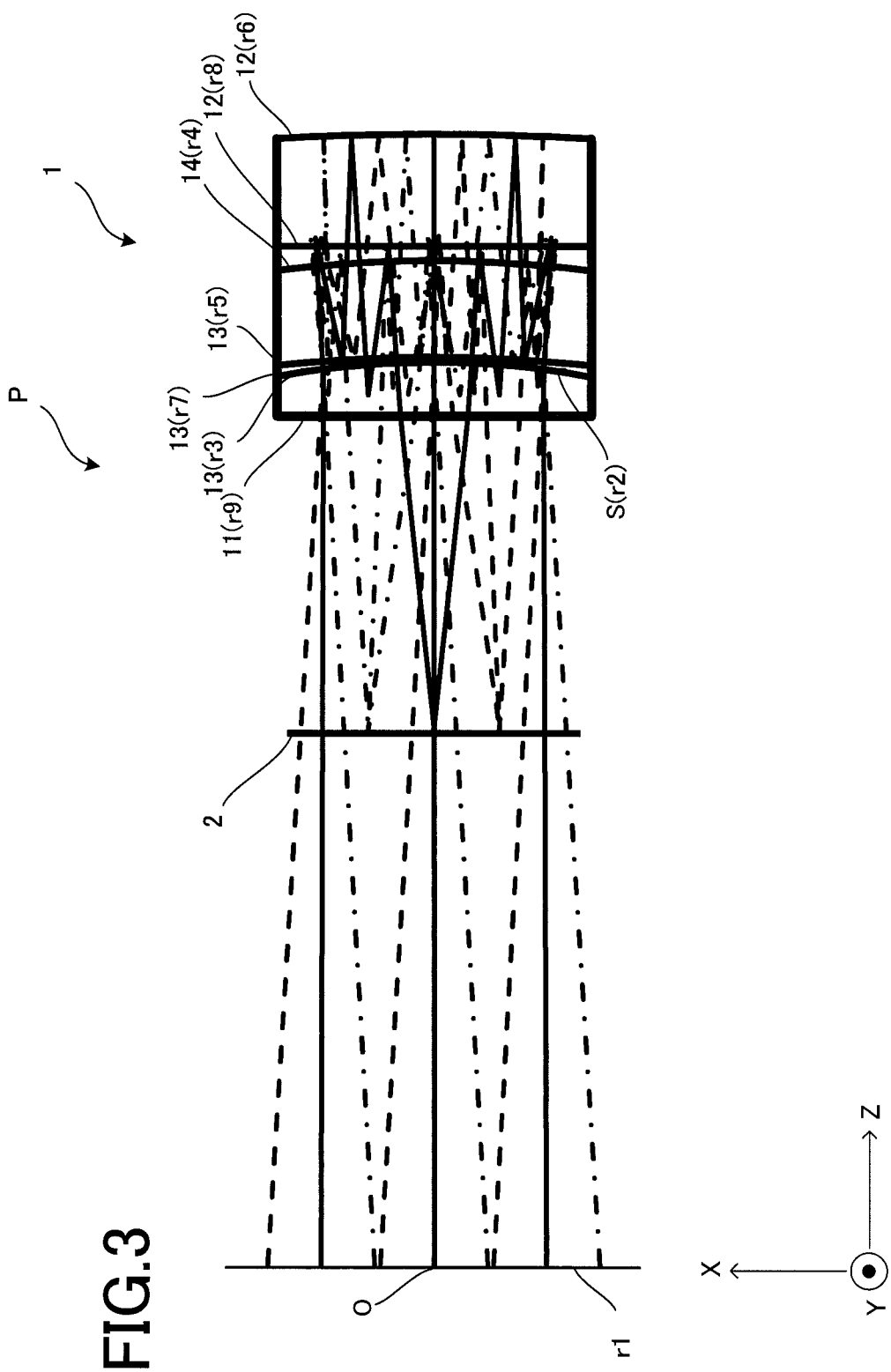
FIG. 3 is an optical path diagram in the X-Z section of Example 1 of the prism optical system.
Figure 4:
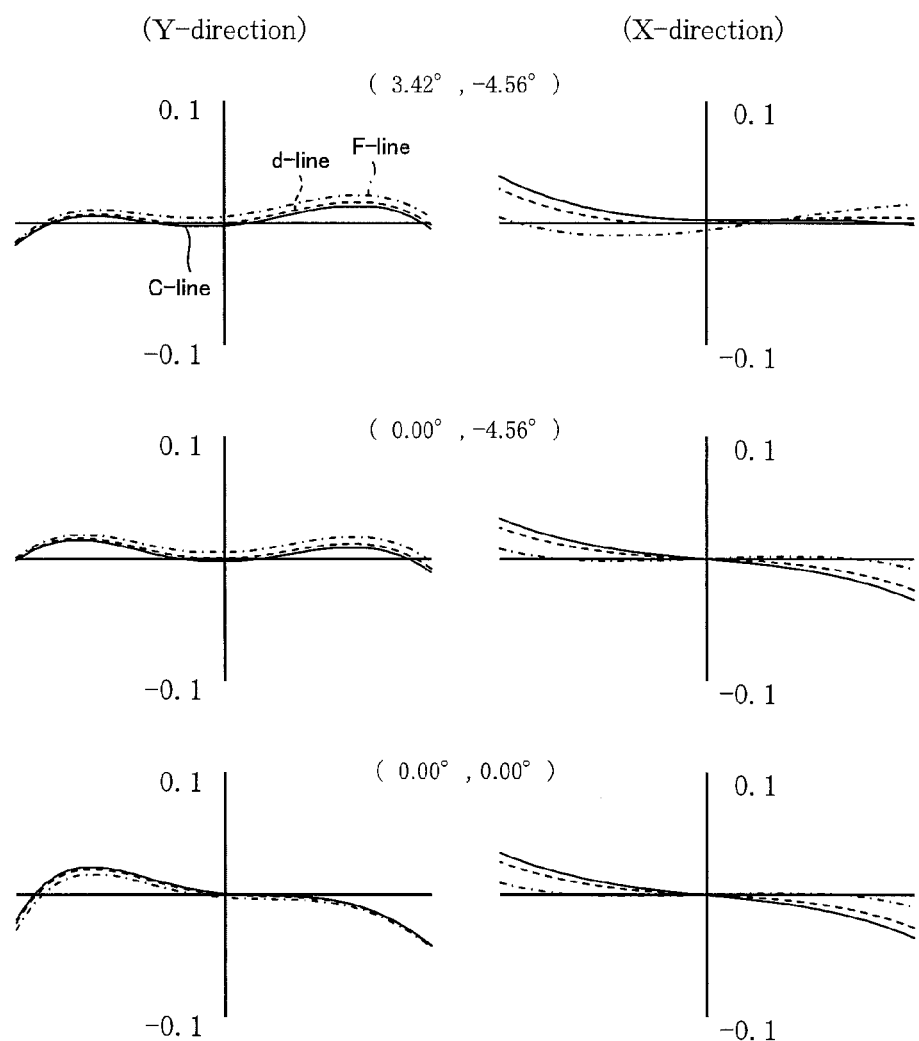
FIG. 4 is a set of transverse aberration diagrams for the whole optical system according to Example 1.
Figure 5:
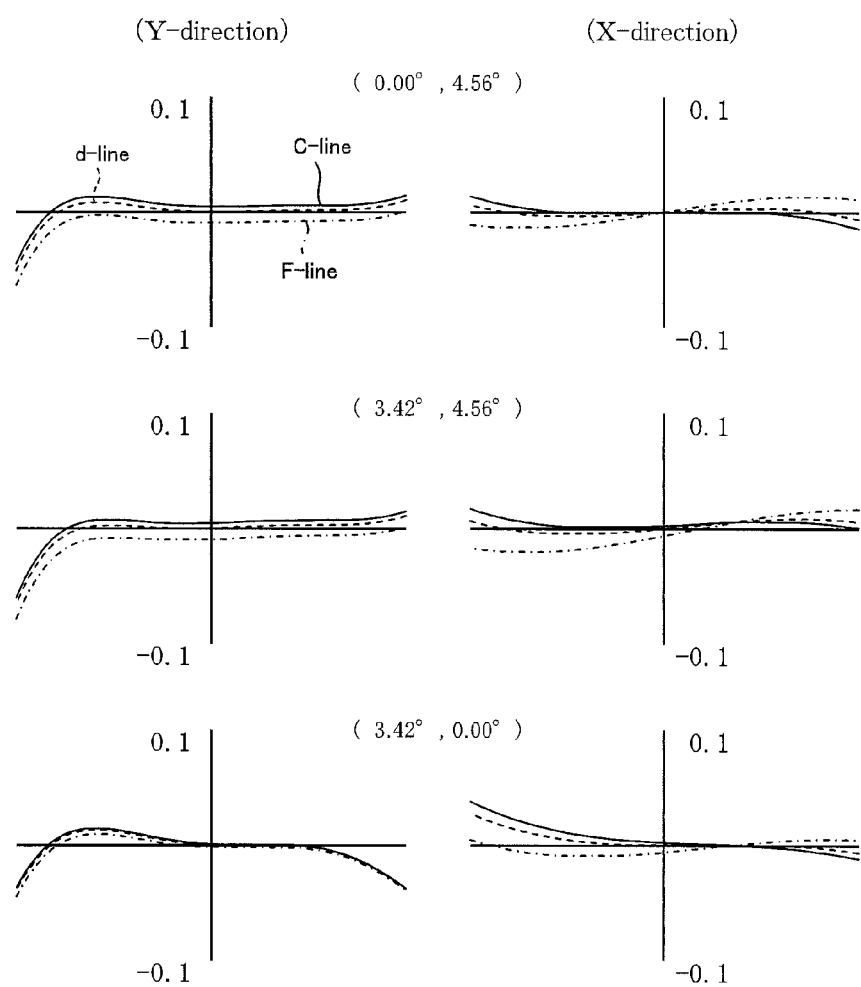
FIG. 5 is a set of transverse aberration diagrams for the whole optical system according to Example 1.

FIGS. 2 and 3 are illustrative in the Y-Z and X-Z sections of the image display apparatus P comprising the prism optical system 1 of Example 1, respectively, and FIGS. 4 and 5 are sets of transverse aberration diagrams for the whole optical system.

The image display apparatus P of Example 1 comprises the prism optical system 1 and the image display device 2.

The prism optical system 1 is built up of five optical surfaces each having optical functions. The first surface 11 is located in opposition to the image display device 2, and capable of one transmission. The second surface 12 is located in opposition to the image display device 2 with the first surface 11 interposed between them, and capable of one internal reflection. The third surface 13 is located in opposition to the image display device 2 side of the second surface 12, and the fourth 14 and the fifth surface 15 to be described later, and capable of one transmission and two internal reflections. The fourth surface 14 is located in opposition to the image display device 2 with the third surface 13 interposed between them, and capable of one internal reflection. The fifth surface 15 is located in opposition to the image display device 2 with the third surface 13 interposed between them, and capable of one internal reflection. There is the exit pupil S positioned near to the transmission surface of the third surface 13.

The third 13, the fourth 14 and the fifth surface 15 are configured as the free-form surfaces that are also the rotationally asymmetric surfaces.

Upon back ray tracing, a light beam incident from the exit pupil S transmits through the third surface 13, entering the prism optical system 1. Then, it is internally reflected at the fifth surface 15, internally reflected at the third surface 13, internally reflected at the fourth surface 14, internally reflected at the third surface 13, and internally reflected at the second surface 12, exiting out from the prism optical system 1. After exiting out from the prism optical system 1, the light beam enters the image display device 2.

Figure 6:
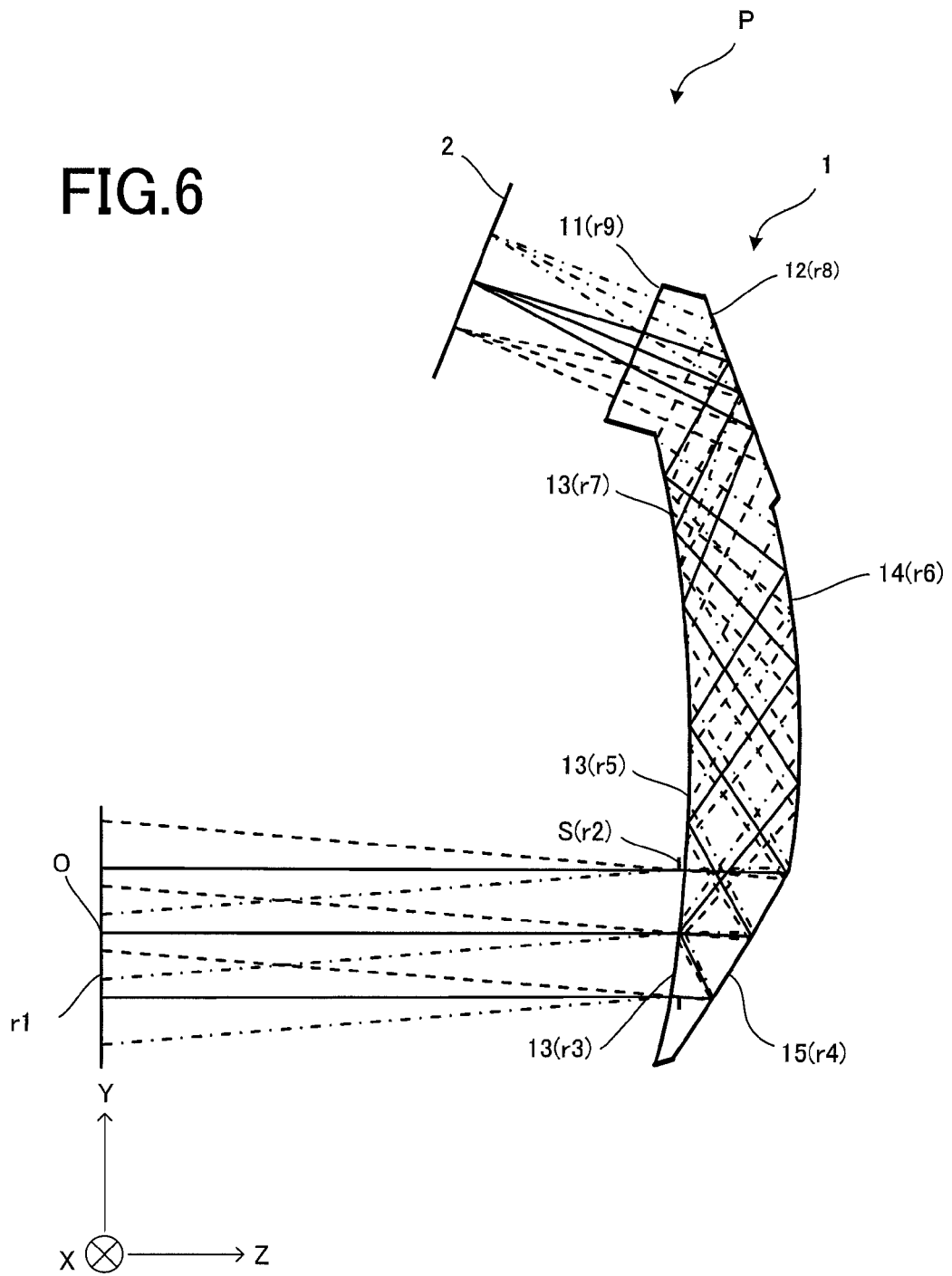
FIG. 6 is illustrative in the Y-Z section of Example 2 of the prism optical system.
Figure 7:
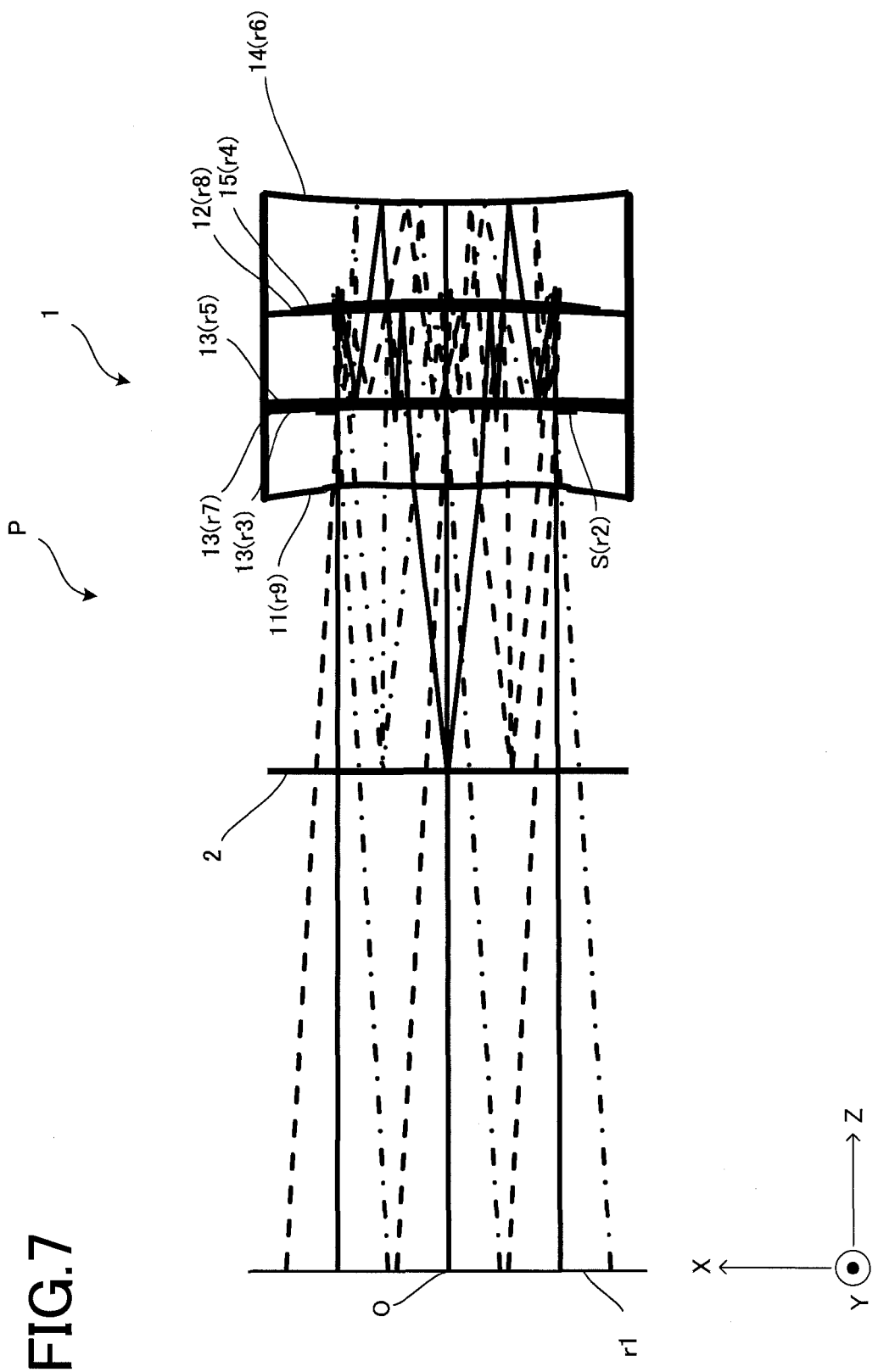
FIG. 7 is an optical path diagram in the X-Z section of Example 2 of the prism optical system.
Figure 8:
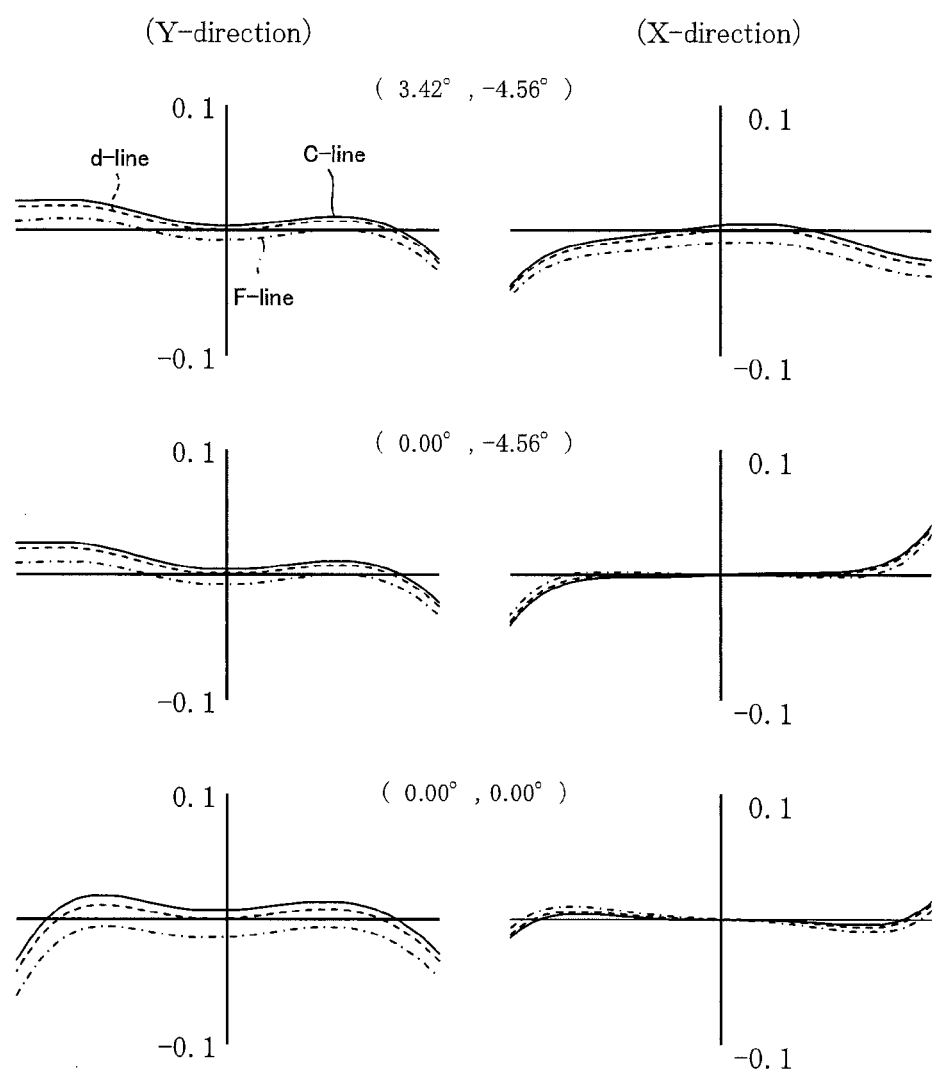
FIG. 8 is a set of transverse aberration diagrams for the whole optical system according to Example 2.
Figure 9:
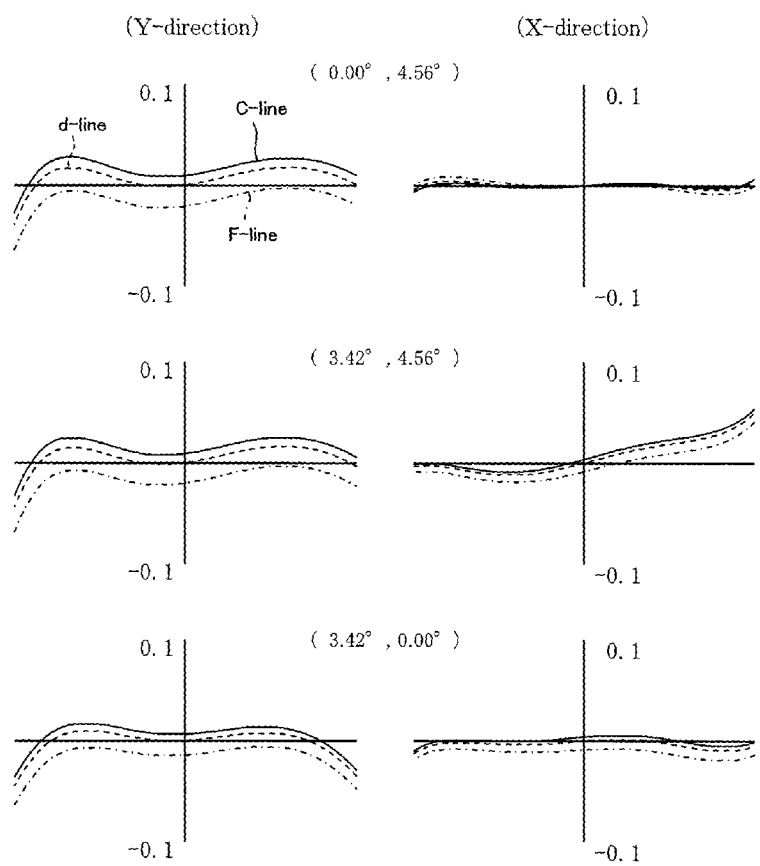
FIG. 9 is a set of transverse aberration diagrams for the whole optical system according to Example 2.

FIGS. 6 and 7 are illustrative in the Y-Z and X-Z sections of the image display apparatus P comprising the prism optical system 1 of Example 2, respectively, and FIGS. 8 and 9 are sets of transverse aberration diagrams for the whole optical system.

The image display apparatus P of Example 2 comprises the prism optical system 1 and the image display device 2.

The prism optical system 1 is built up of five optical surfaces, each having optical functions. The first surface 11 is located in opposition to the image display device 2, and capable of one transmission. The second surface 12 is located in opposition to the image display device 2 with the first surface 11 interposed between them, and capable of one internal reflection. The third surface 13 is located in opposition to the side of the image display device 2 of the second surface 12, and the fourth 14 and the fifth surface 15 to be described later, and capable of one transmission and two internal reflections. The fourth surface 14 is located in opposition to the image display device 2 with the third surface 13 interposed between them, and capable of one internal reflection. The fifth surface 15 is located in opposition to the image display device 2 with the third surface 13 interposed between them. There is the exit pupil S located near to the transmission surface of the third surface 13.

In Example 2, the first 11, the second 12, the third 13, the fourth 14 and the fifth surface 15 are each configured as the free-form surface that is also the rotationally asymmetric surface.

Upon back ray tracing, a light beam incident from the exit pupil enters the prism optical system 1 through the third surface 13. Then, it is internally reflected at the fifth surface 15, internally reflected at the third surface 13, internally reflected at the fourth surface 14, internally reflected at the third surface 13, and internally reflected at the second surface 12, exiting out from the prism optical system 1 through the first surface 11. After exiting out from the prism optical system 1, the light beam enters the image display device 2.

The prism optical system 1 here will now be explained with reference to a specific example. FIG. 10 is illustrative in conception of the prism optical system 1 according to the second embodiment of the invention.

As depicted in FIG. 10, the prism optical system 1 according to the second embodiment comprises four optical surfaces, each having optical functions. At least two of the four optical surfaces are rotationally asymmetric surfaces, and one of two surfaces on which light is incident or from which light exits out is capable of one transmission and two internal reflections.

In the image display apparatus P, the image display device 2 is located in opposition to the first surface 11 that is also the entrance surface through which light enters the prism optical system 1, and the viewer s eyeball 3 is located in opposition to the third surface 13 that functions as the transmitting area of the surface from which light exits out, so that enlarged virtual images can be presented to the viewer.

The second embodiment of the invention will now be explained with reference to Example 3.

Figure 11:
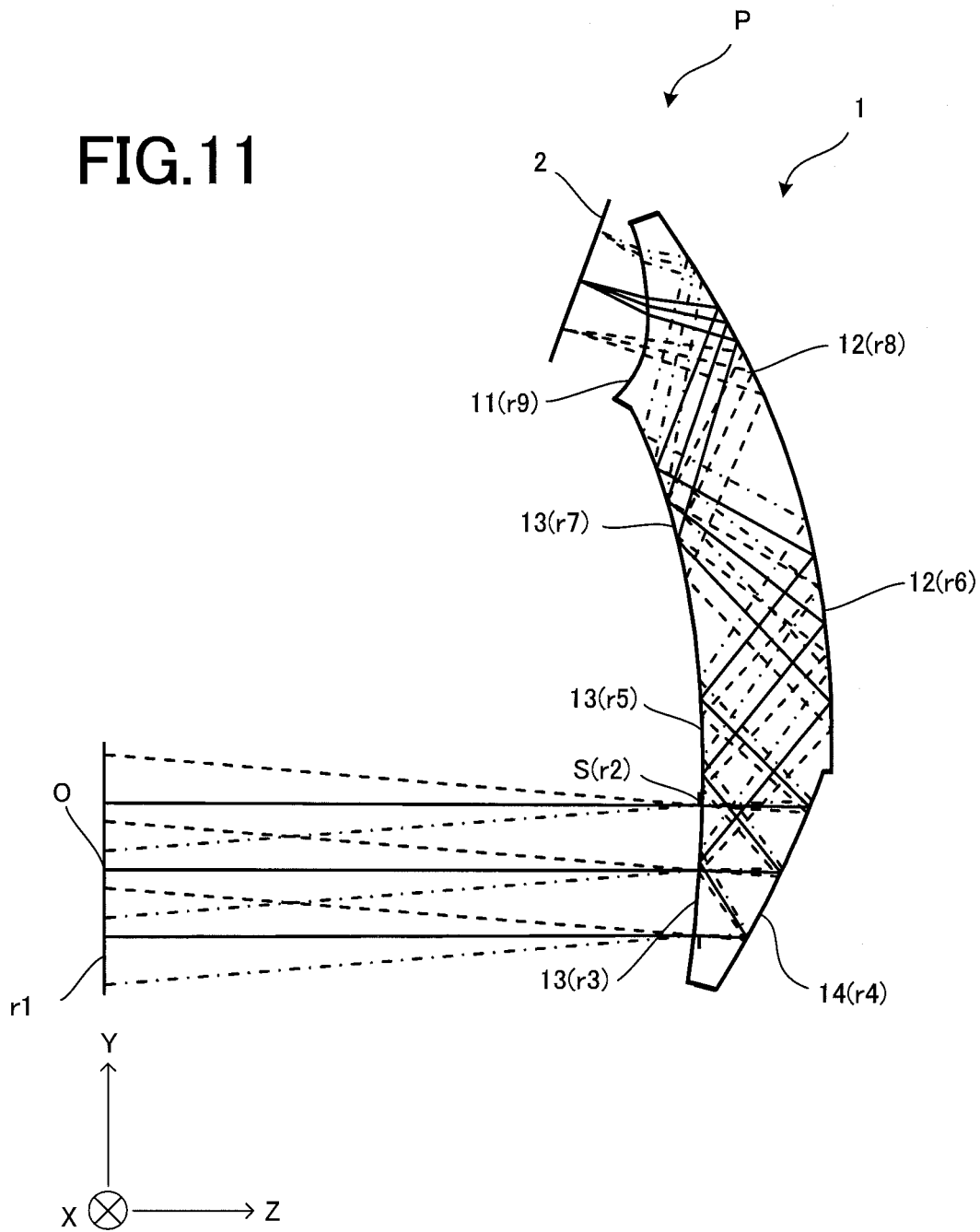
FIG. 11 is an optical path diagram in the Y-Z section of Example 3 of the prism optical system.
Figure 12:
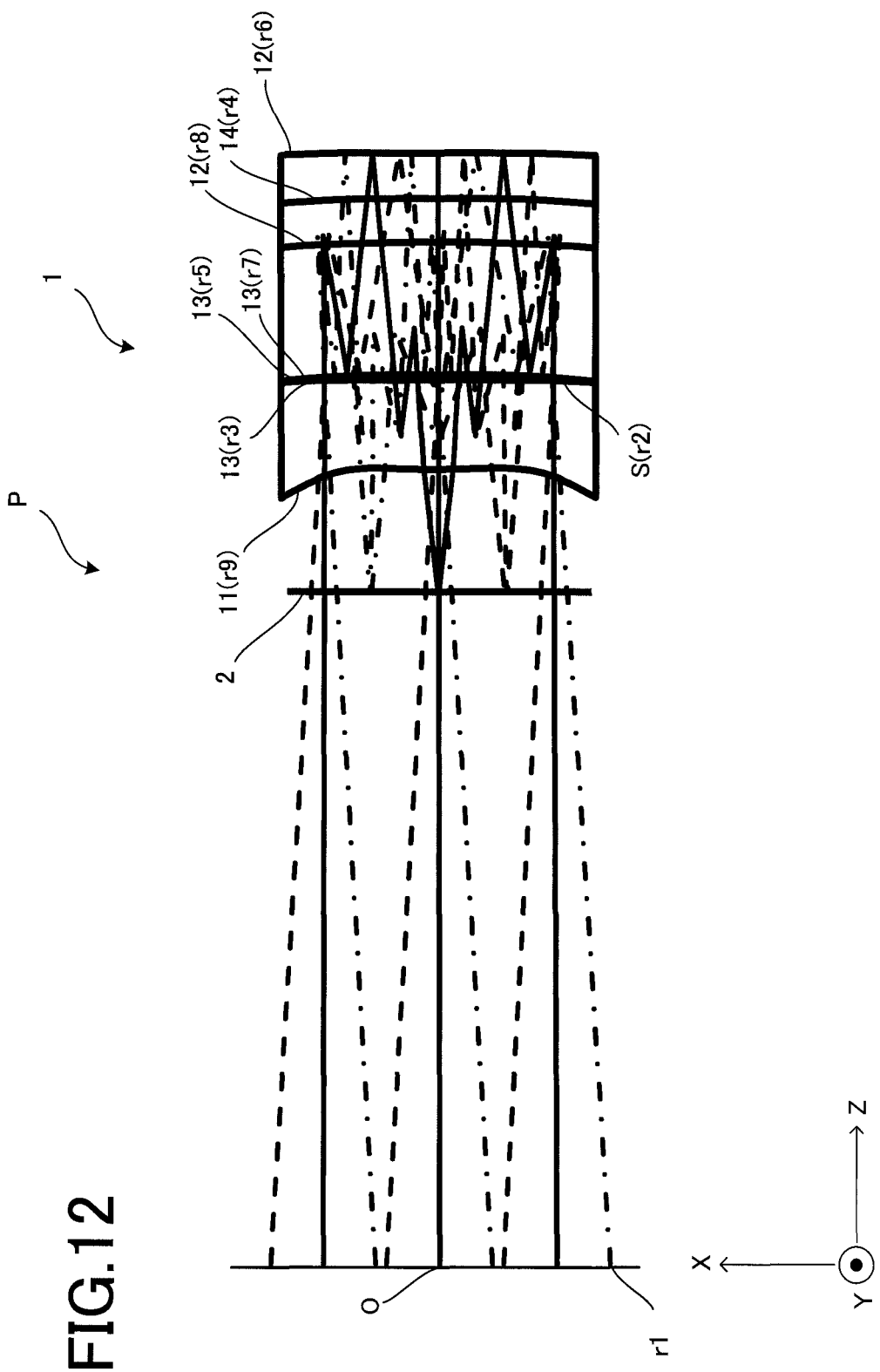
FIG. 12 is an optical path diagram in the X-Z section of Example 3 of the prism optical system.
Figure 13:
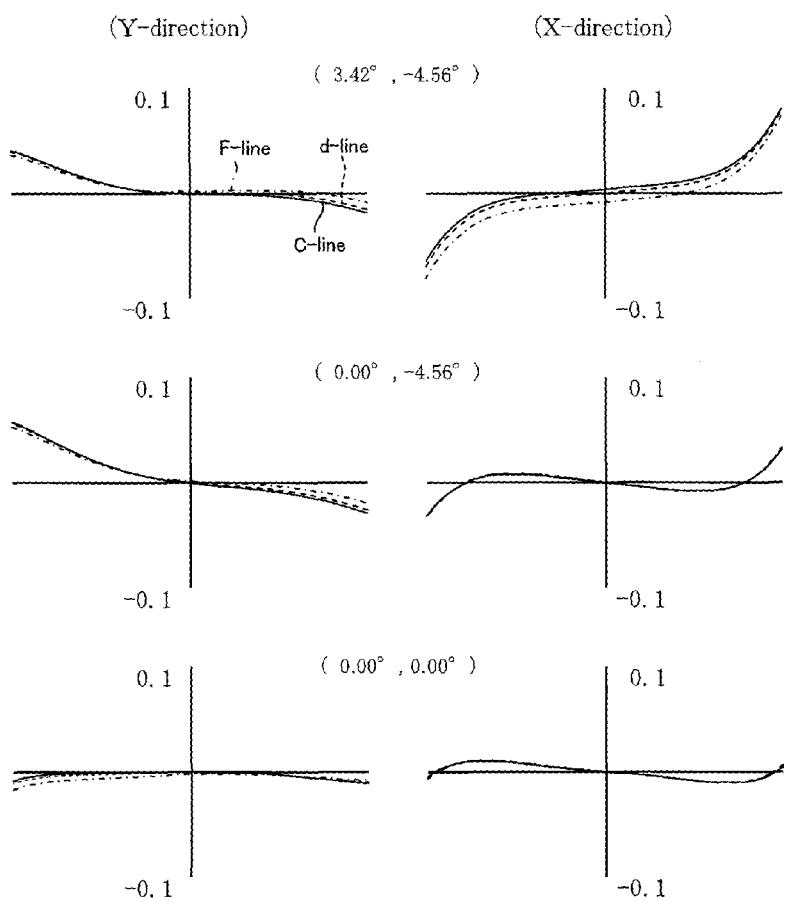
FIG. 13 is a set of transverse aberration diagrams for the whole optical system of Example 3.
Figure 14:
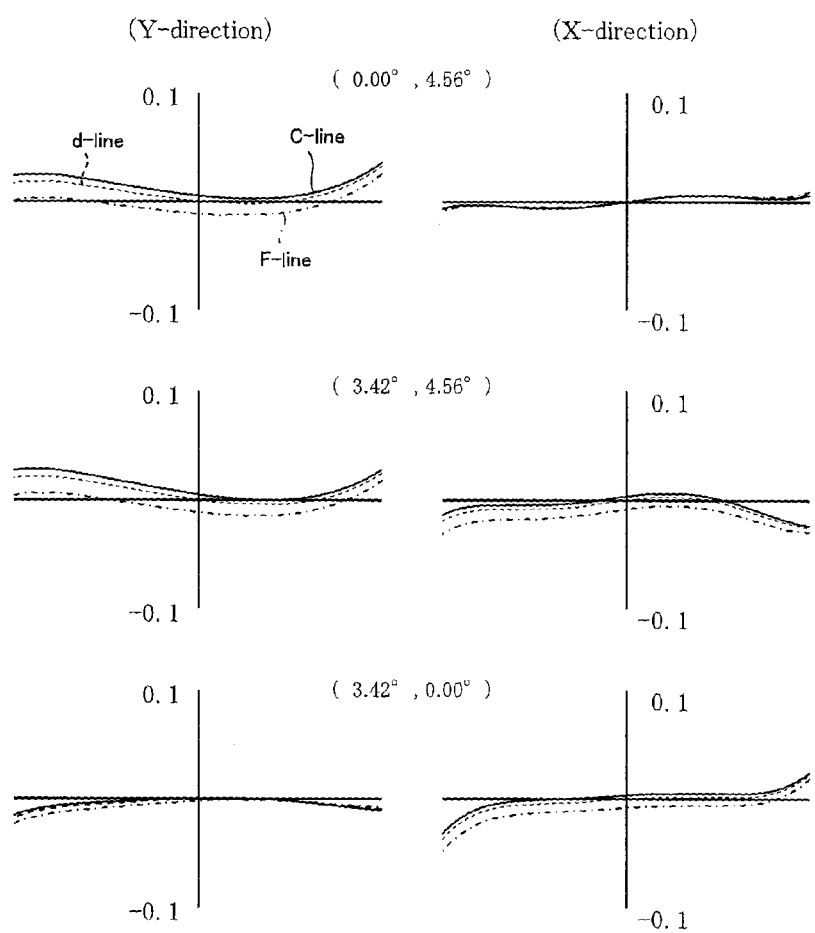
FIG. 14 is a set of transverse aberration diagrams for the whole optical system of Example 3.

FIGS. 11 and 12 are illustrative in the Y-Z section and the X-Z section of the image display apparatus P comprising the prism optical system 1 of Example 3, respectively, and FIGS. 13 and 14 are sets of transverse aberration diagrams for the optical system.

The image display apparatus P of Example 3 comprises the prism optical system 1 and the image display device 2.

The prism optical system 1 is built up of four optical surfaces, each having optical functions. The first surface 11 is located in opposition to the image display device 1, and capable of one transmission. The second surface 11 is located in opposition to the image display device 2 with the first surface 11 interposed between them, and capable of two internal reflections. The third surface 13 is located on the image display device 2 side of the second 12, and the fourth surface 14 to be described later, and capable of one transmission and two internal reflections. The fourth surface 14 is located in opposition to the image display device 2 with the third surface 13 interposed between them, and capable of one internal reflection. There is the exit pupil S located near the transmission surface of the third surface 13.

The first 11, the second 12, the third 13 and the fourth surface 14 are each configured as the free-form surface that is also the rotationally asymmetric surface.

Upon back ray tracing, a light beam emanating from the exit pupil enters the prism optical system 1 through the third surface 13. Then, it is internally reflected at the fourth surface 14, internally reflected at the third surface 13, internally reflected at the second surface 12, internally reflected at the third surface 13, and internally reflected at the second surface 12, exiting out from the prism optical system 1 through the first surface 11. After exiting out from the prism optical system 1, the light beam enters the image display device 2.

Tabulated below are the constituting parameters of Examples 1, 2 and 3. Note here that in the following table, FFS stands for the free-form surface.

Example 1

| Surface No. | Radius of Curvature | Surface Separation | Decentration | Refractive | Abbe Index |
|---|---|---|---|---|---|
| Constant Object Plane | ∞ | −1000.00 | | | |
| r1 | ∞ (Dummy Plane) | 0.00 | | | |
| r2 | ∞ (Exit Pupil) | 0.00 | Decentration (1) | | |
| r3 | FFS[1] | 0.00 | Decentration (2) | 1.5254 | 56.2 |
| r4 | FFS[2] | 0.00 | Decentration (3) | 1.5254 | 56.2 |
| r5 | FFS[1] | 0.00 | Decentration (2) | 1.5254 | 56.2 |
| r6 | FFS[3] | 0.00 | Decentration (4) | 1.5254 | 56.2 |
| r7 | FFS[1] | 0.00 | Decentration (2) | 1.5254 | 56.2 |
| r8 | ∞ | 0.00 | Decentration (5) | 1.5254 | 56.2 |
| r9 | ∞ | 0.00 | Decentration (6) | | |
| Image Plane | ∞ | 0.00 | Decentration (7) | | |

FFS[1]

| | | | | | |
|---|---|---|---|---|---|
| C4 | −2.291E−002 | C6 | −6.249E−003 | C8 | 2.241E−003 |
| C10 | 1.034E−004 | C11 | −6.807E−005 | C13 | 8.403E−006 |
| C15 | −3.302E−005 | C17 | 1.808E−006 | C19 | −5.266E−006 |
| C21 | 2.248E−006 | C22 | −1.361E−007 | C24 | 6.973E−008 |
| C26 | 1.498E−007 | C28 | −4.946E−008 | | |

FFS[2]

| | | | | | |
|---|---|---|---|---|---|
| C4 | −1.797E−002 | C6 | −4.669E−003 | C8 | 1.382E−003 |
| C10 | −6.738E−005 | C11 | −1.528E−005 | C13 | −4.124E−005 |
| C15 | 2.689E−007 | | | | |

FFS[3]

| | | | | | |
|---|---|---|---|---|---|
| C4 | −6.685E−003 | C6 | −1.107E−002 | C8 | 1.276E−003 |
| C10 | −5.050E−005 | C11 | −1.994E−005 | C13 | 1.201E−005 |
| C15 | −1.569E−005 | C17 | 8.582E−007 | C19 | −2.122E−007 |
| C21 | 3.093E−007 | | | | |

Decentration [1]

| X | 0.00 | Y | 8.73 | Z | 20.00 |
|---|---|---|---|---|---|
| α | 0.00 | β | 0.00 | γ | 0.00 |

-continued

Decentration [2]

| X | 0.00 | Y | 10.13 | Z | 20.11 |
|---|---|---|---|---|---|
| α | −4.10 | β | 0.00 | γ | 0.00 |

Decentration [3]

| X | 0.00 | Y | 6.49 | Z | 22.60 |
|---|---|---|---|---|---|
| α | −29.54 | β | 0.00 | γ | 0.00 |

Decentration [4]

| X | 0.00 | Y | 18.61 | Z | 26.42 |
|---|---|---|---|---|---|
| α | 1.78 | β | 0.00 | γ | 0.00 |

Decentration [5]

| X | 0.00 | Y | 34.56 | Z | 23.28 |
|---|---|---|---|---|---|
| α | 23.03 | β | 0.00 | γ | 0.00 |

Decentration [6]

| X | 0.00 | Y | 35.83 | Z | 18.73 |
|---|---|---|---|---|---|
| α | −7.11 | β | 0.00 | γ | 0.00 |

Decentration [7]

| X | 0.00 | Y | 38.95 | Z | 10.17 |
|---|---|---|---|---|---|
| α | −20.15 | β | 0.00 | γ | 0.00 |

Example 2

| Surface No. | Radius of Curvature | Surface Separation | Decentration | Refractive | Abbe Index |
|---|---|---|---|---|---|
| Constant Object Plane | ∞ | −1000.00 | | | |
| r1 | ∞ (Dummy Plane) | 0.00 | | | |
| r2 | ∞ (Exit Pupil) | 0.00 | Decentration (1) | | |
| r3 | FFS[1] | 0.00 | Decentration (2) | 1.5254 | 56.2 |
| r4 | FFS[2] | 0.00 | Decentration (3) | 1.5254 | 56.2 |
| r5 | FFS[1] | 0.00 | Decentration (2) | 1.5254 | 56.2 |
| r6 | FFS[3] | 0.00 | Decentration (4) | 1.5254 | 56.2 |
| r7 | FFS[1] | 0.00 | Decentration (2) | 1.5254 | 56.2 |
| r8 | FFS[4] | 0.00 | Decentration (5) | 1.5254 | 56.2 |
| r9 | FFS[5] | 0.00 | Decentration (6) | | |
| Image Plane | ∞ | 0.00 | Decentration (7) | | |

FFS[1]

| | | | | | |
|---|---|---|---|---|---|
| C4 | 1.088E−003 | C6 | −5.718E−003 | C8 | −2.729E−004 |
| C10 | 1.762E−004 | C11 | −5.057E−005 | C13 | 4.190E−006 |
| C15 | −3.474E−005 | C17 | −8.264E−006 | C19 | −1.217E−006 |
| C21 | 1.883E−006 | C22 | −1.446E−006 | C24 | 7.462E−007 |
| C26 | 3.155E−008 | C28 | −3.487E−008 | | |

FFS[2]

| | | | | | |
|---|---|---|---|---|---|
| C4 | −7.189E−003 | C6 | −5.584E−003 | C8 | −1.761E−004 |
| C10 | −1.127E−004 | C11 | −3.659E−005 | C13 | 7.966E−006 |
| C15 | 2.689E−007 | | | | |

FFS[3]

| | | | | | |
|---|---|---|---|---|---|
| C4 | 7.890E−003 | C6 | −1.030E−002 | C8 | −7.428E−005 |
| C10 | 6.409E−006 | C11 | 7.616E−005 | C13 | 1.487E−005 |
| C15 | −1.450E−005 | C17 | −4.131E−007 | C19 | −9.396E−007 |
| C21 | 2.538E−007 | | | | |

FFS[4]

| | | | | | |
|---|---|---|---|---|---|
| C4 | −8.047E−003 | C6 | −6.341E−004 | C8 | −1.116E−003 |
| C10 | −2.146E−005 | C11 | −3.318E−004 | C13 | −5.037E−005 |
| C15 | 1.909E−005 | | | | |

-continued

| | | FFS[5] | | | |
|---|---|---|---|---|---|
| C4 | 2.450E−002 | C6 | −7.855E−003 | C8 | −3.415E−003 |
| C10 | −3.106E−004 | C11 | −2.479E−003 | C13 | −4.335E−004 |
| C15 | 4.757E−004 | | | | |

| Decentration [1] | | | | | |
|---|---|---|---|---|---|
| X | 0.00 | Y | 0.00 | Z | 20.01 |
| α | 0.00 | β | 0.00 | γ | 0.00 |

| Decentration [2] | | | | | |
|---|---|---|---|---|---|
| X | 0.00 | Y | 1.15 | Z | 20.14 |
| α | −5.50 | β | 0.00 | γ | 0.00 |

| Decentration [3] | | | | | |
|---|---|---|---|---|---|
| X | 0.00 | Y | 0.10 | Z | 23.65 |
| α | −31.12 | β | 0.00 | γ | 0.00 |

| Decentration [4] | | | | | |
|---|---|---|---|---|---|
| X | 0.00 | Y | 10.01 | Z | 25.85 |
| α | 0.53 | β | 0.00 | γ | 0.00 |

| Decentration [5] | | | | | |
|---|---|---|---|---|---|
| X | 0.00 | Y | 25.69 | Z | 23.00 |
| α | 20.69 | β | 0.00 | γ | 0.00 |

| Decentration [6] | | | | | |
|---|---|---|---|---|---|
| X | 0.00 | Y | 27.79 | Z | 18.00 |
| α | −23.66 | β | 0.00 | γ | 0.00 |

| Decentration [7] | | | | | |
|---|---|---|---|---|---|
| X | 0.00 | Y | 31.01 | Z | 10.04 |
| α | −22.00 | β | 0.00 | γ | 0.00 |

Example 3

| Surface No. | Radius of Curvature | Surface Separation | Decentration | Refractive | Abbe Index |
|---|---|---|---|---|---|
| Constant Object Plane | ∞ | −1000.00 | | | |
| r1 | ∞ (Dummy Plane) | 0.00 | | | |
| r2 | ∞ (Exit Pupil) | 0.00 | Decentration (1) | | |
| r3 | FFS[1] | 0.00 | Decentration (2) | 1.5254 | 56.2 |
| r4 | FFS[2] | 0.00 | Decentration (3) | 1.5254 | 56.2 |
| r5 | FFS[1] | 0.00 | Decentration (2) | 1.5254 | 56.2 |
| r6 | FFS[3] | 0.00 | Decentration (4) | 1.5254 | 56.2 |
| r7 | FFS[1] | 0.00 | Decentration (2) | 1.5254 | 56.2 |
| r8 | FFS[3] | 0.00 | Decentration (4) | 1.5254 | 56.2 |
| r9 | FFS[4] | 0.00 | Decentration (5) | | |
| Image Plane | ∞ | 0.00 | Decentration (6) | | |

| | | FFS[1] | | | |
|---|---|---|---|---|---|
| C4 | 6.402E−004 | C6 | −6.128E−003 | C8 | −4.180E−004 |
| C10 | 1.481E−004 | C11 | −1.265E−004 | C13 | −3.191E−006 |
| C15 | −3.615E−005 | C17 | −2.987E−005 | C19 | −1.416E−006 |
| C21 | 1.835E−006 | C22 | −2.344E−006 | C24 | 1.589E−006 |
| C26 | −2.149E−009 | C28 | −3.604E−008 | | |

| | | FFS[2] | | | |
|---|---|---|---|---|---|
| C4 | −7.740E−003 | C6 | −8.267E−003 | C8 | −2.655E−004 |
| C10 | −1.101E−004 | C11 | −9.852E−005 | C13 | −3.129E−006 |
| C15 | 2.689E−007 | | | | |

| | | FFS[3] | | | |
|---|---|---|---|---|---|
| C4 | 3.446E−003 | C6 | −9.360E−003 | C8 | −6.945E−004 |
| C10 | −7.879E−005 | C11 | −2.149E−004 | C13 | 1.145E−005 |
| C15 | −1.478E−005 | C17 | −1.040E−006 | C19 | −1.398E−006 |
| C21 | 4.4022E−007 | | | | |

| | | FFS[4] | | | |
|---|---|---|---|---|---|
| C4 | 2.431E−002 | C6 | −4.411E−002 | C8 | −2.427E−003 |
| C10 | 7.360E−003 | C11 | −4.808E−003 | C13 | 2.438E−004 |
| C15 | −1.651E−003 | | | | |

| Decentration [1] | | | | | |
|---|---|---|---|---|---|
| X | 0.00 | Y | 0.00 | Z | 20.00 |
| α | 0.00 | β | 0.00 | γ | 0.00 |

| Decentration [2] | | | | | |
|---|---|---|---|---|---|
| X | 0.00 | Y | −2.34 | Z | 19.81 |
| α | −5.50 | β | 0.00 | γ | 0.00 |

| Decentration [3] | | | | | |
|---|---|---|---|---|---|
| X | 0.00 | Y | −3.66 | Z | 21.92 |
| α | −30.32 | β | 0.00 | γ | 0.00 |

| Decentration [4] | | | | | |
|---|---|---|---|---|---|
| X | 0.00 | Y | 6.42 | Z | 26.23 |
| α | 0.54 | β | 0.00 | γ | 0.00 |

| Decentration [5] | | | | | |
|---|---|---|---|---|---|
| X | 0.00 | Y | 26.07 | Z | 17.62 |
| α | 3.18 | β | 0.00 | γ | 0.00 |

| Decentration [6] | | | | | |
|---|---|---|---|---|---|
| X | 0.00 | Y | 27.24 | Z | 14.42 |
| α | −20.00 | β | 0.00 | γ | 0.00 |

Figure 15:
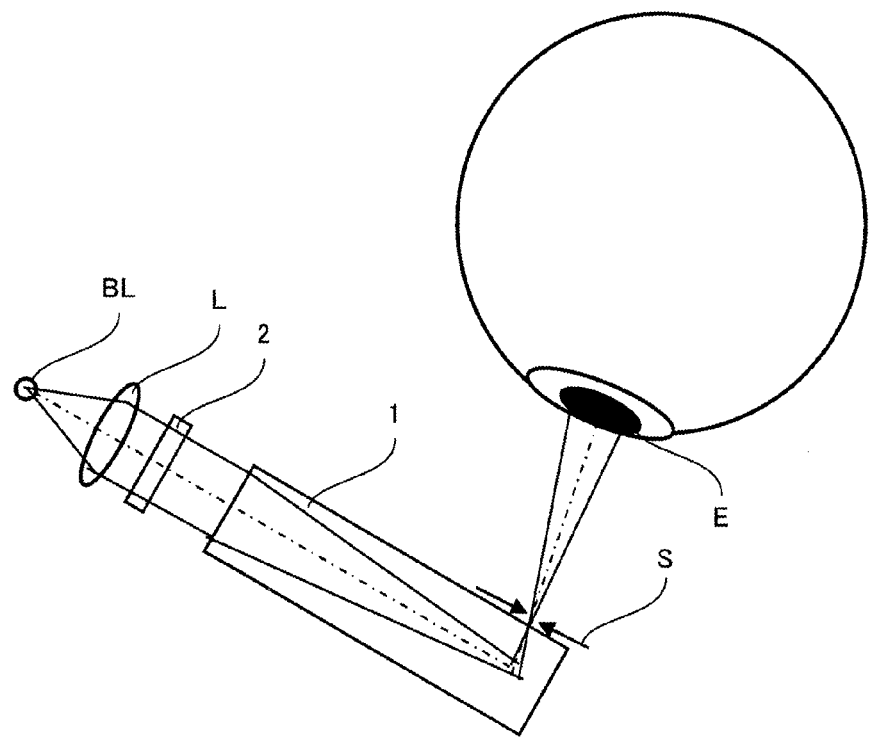
FIG. 15 is illustrative of the basic construction of the image display apparatus using the prism optical system.

FIG. 15 is illustrative in schematic of the basic arrangement of the image display apparatus incorporating the prism optical system.

The object of the instant embodiment is to use the prism optical system 1 and the image display device 2 thereby providing the image display apparatus P that can be reduced in terms of size, weight and cost, and allows those who put on it to look objectively quite natural.

The image display apparatus P here uses a liquid crystal display device as the image display device 2. The use of the liquid crystal display device requires a backlight BL as a light source. In the embodiment here, a lighting lens L is interposed between the backlight BL and the image display device 2.

Such construction of the image display apparatus P here enables image-bearing light exiting out from the image display device 2 to be bent by the prism optical system 1 having positive power toward the eyeball, and makes it possible for the viewer to view an image as a virtual image.

The vicinity of the exit portion may be designed to function as a sort of aperture stop S so that an image can be viewed even when the prism optical system 1 per se is in a low-profile, elongated form.

When the image display device 2 is a liquid crystal display device, there is the need for using backlight BL and, in view of lighting efficiency, it is desired that an image at the light source is positioned near the exit window.

Preferably, the prism optical system is positioned such that the on-axis chief ray exiting out from the image display apparatus is positioned somewhat outside of the front direction of the eyeball; so there is no risk of the display screen or a reflection portion standing in the way to the front of the field of vision. Moreover, the optical path involved can be so curtailed that the prism optical system can be made more compact.

Figure 16:
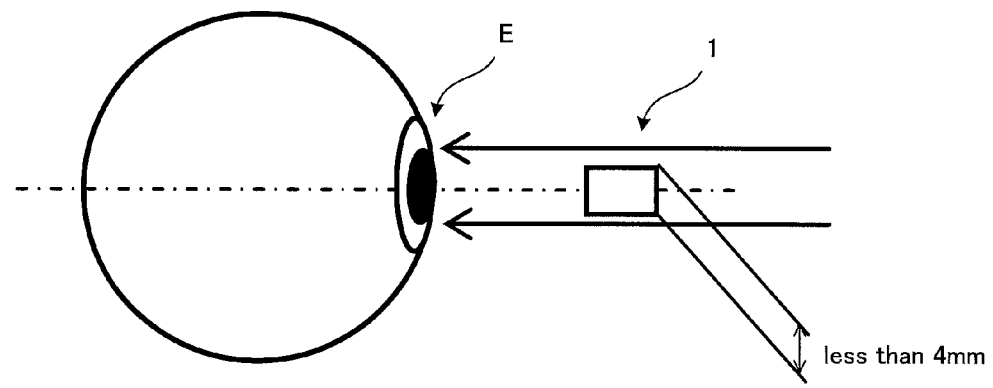
FIG. 16 is a side view of the image display apparatus using the prism optical system.
Figure 17:
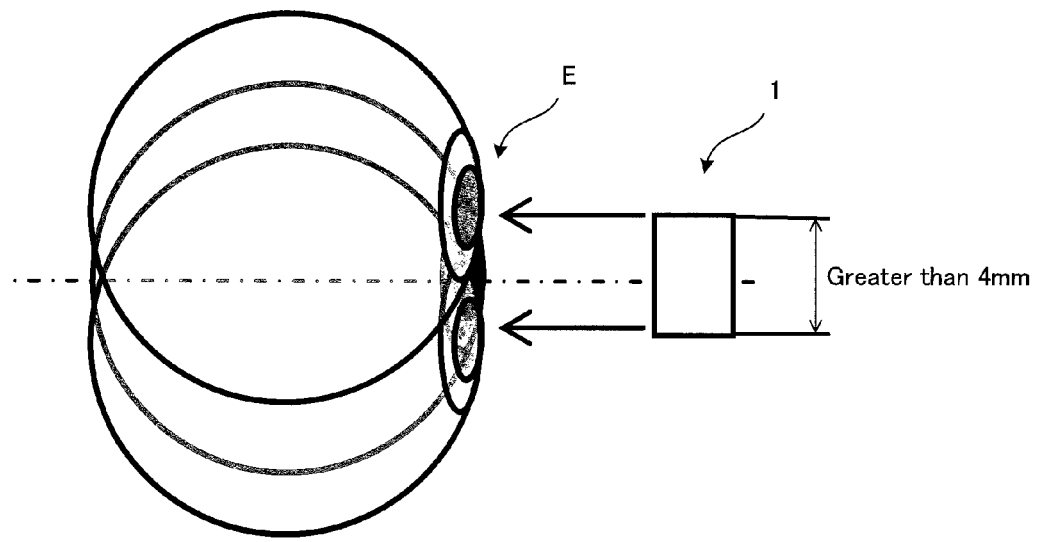
FIG. 17 is a side view of the image display apparatus using the prism optical system.

FIG. 16 is a side view of the image display apparatus incorporating the prism optical system, and FIG. 17 is a side view of the image display apparatus incorporating the prism optical system.

As the vertical width of the portion of the prism optical system 1 opposing to the viewer s pupil E is set at less than 4 mm that is a human being s average pupil diameter as shown in FIG. 16, it brings about the see-through feature: scenes behind the prism optical system 1 are visible to the viewer s pupil E from above and below the prism optical system 1.

As the vertical width of the portion of the prism optical system 1 opposing to the viewer s pupil E is set at greater than 4 mm as shown in FIG. 17, there is a longitudinal width long enough to provide a wide tolerance to vertical shifts.

Figure 18:
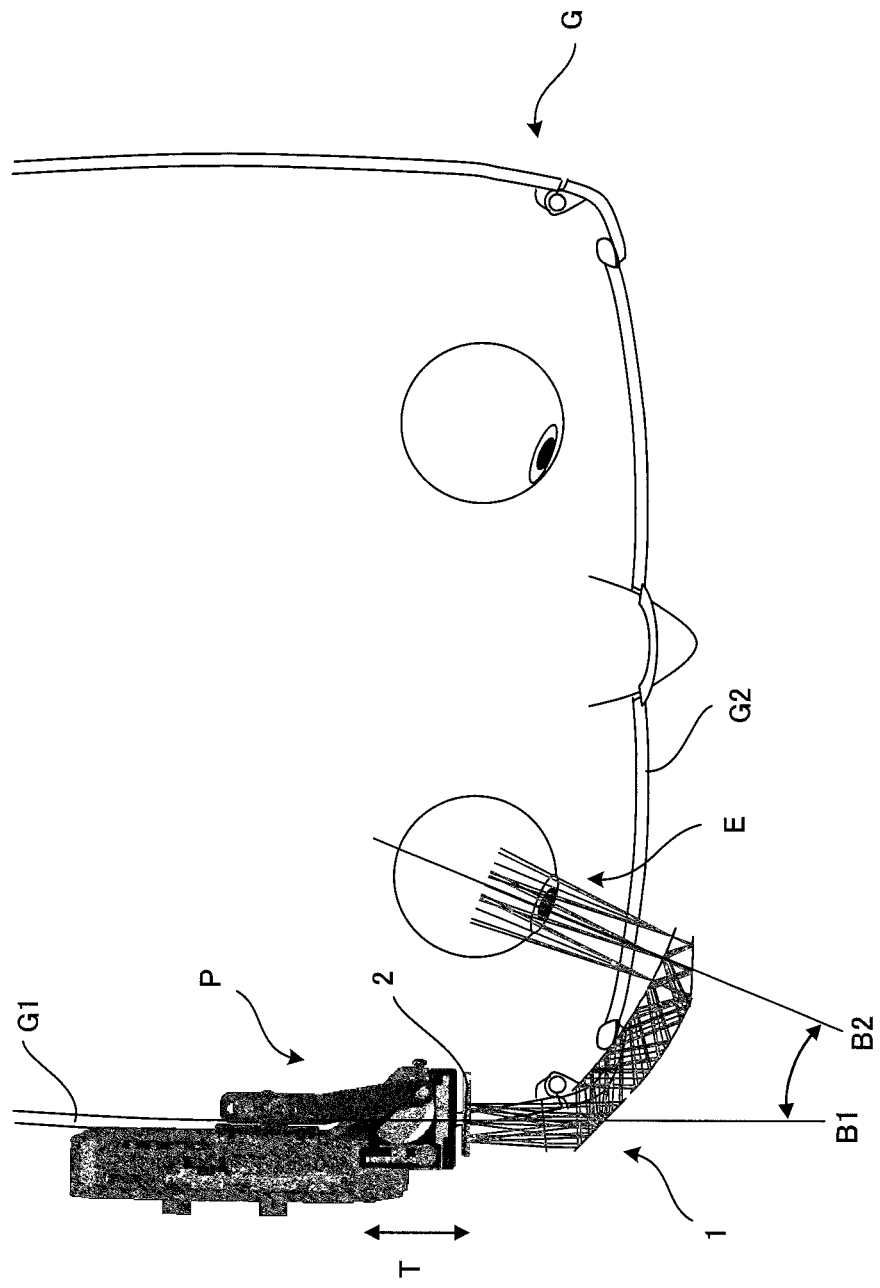
FIG. 18 is a general view of an eyeglasses type image display apparatus using the prism optical system.
Figure 19:
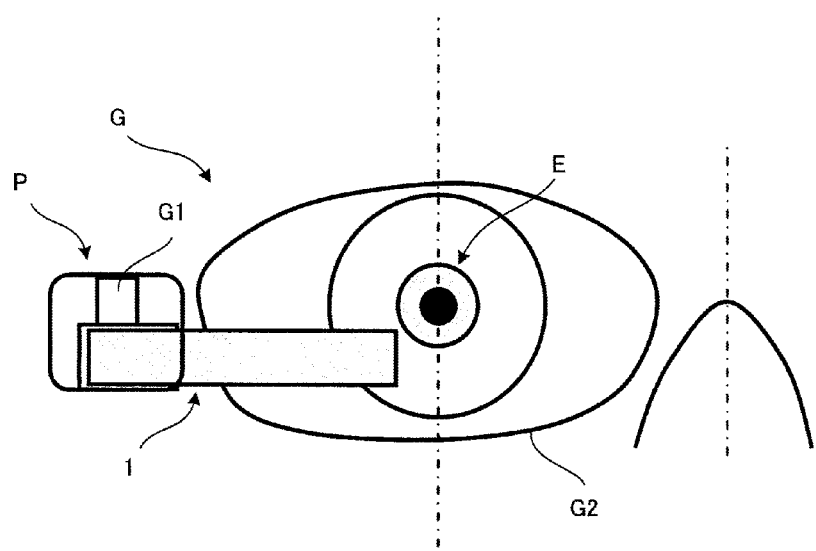
FIG. 19 is a front view of an eyeglasses type image display apparatus using the prism optical system.

FIG. 18 is illustrative of the eyeglasses type image display apparatus P incorporating the prism optical system 1, and FIG. 19 is a front view of the eyeglasses type image display apparatus P incorporating the prism optical system 1.

The image display apparatus P here is provided in the form of an eyeglasses type image display apparatus that enables the outside world and electronic images to be simultaneously viewed without obstructing the outside world field of view, and can be reduced in terms of size, weight and cost.

As depicted in FIG. 18, the prism optical system 1 may be attached to the eyeglasses G. Image-bearing light exiting out from the image display device 2 turning in the front direction is directed toward the pupil via the prism optical system 1. The prism optical system 1 has positive power enough to enlarge an image from the image display device 2 so that the wearer can view it as a virtual image. The image display device 2 may be moved back and forth in a direction substantially along the temple portion (indicated by a double action arrow T) for diopter adjustment. Note here that the angle that the first axial chief ray B1 exiting out from the center of the image display device 2 forms with the second axial chief ray B2 exiting out from the prism and arriving at the center of the viewer s pupil is preferably 0° to 40°.

In the image display apparatus P shown in FIGS. 1 and 10, the prism optical system 1 is located in opposition to the viewer s pupil E as viewed from front, as shown in FIG. 19, so that enlarged virtual images can be presented to the viewer.

If, instead of the image display device 2, an imaging device (not shown) is used with the prism optical system 1 of the embodiment here, it is then possible to provide an imaging apparatus that can be reduced in terms of size, weight and cost.

Figure 20:
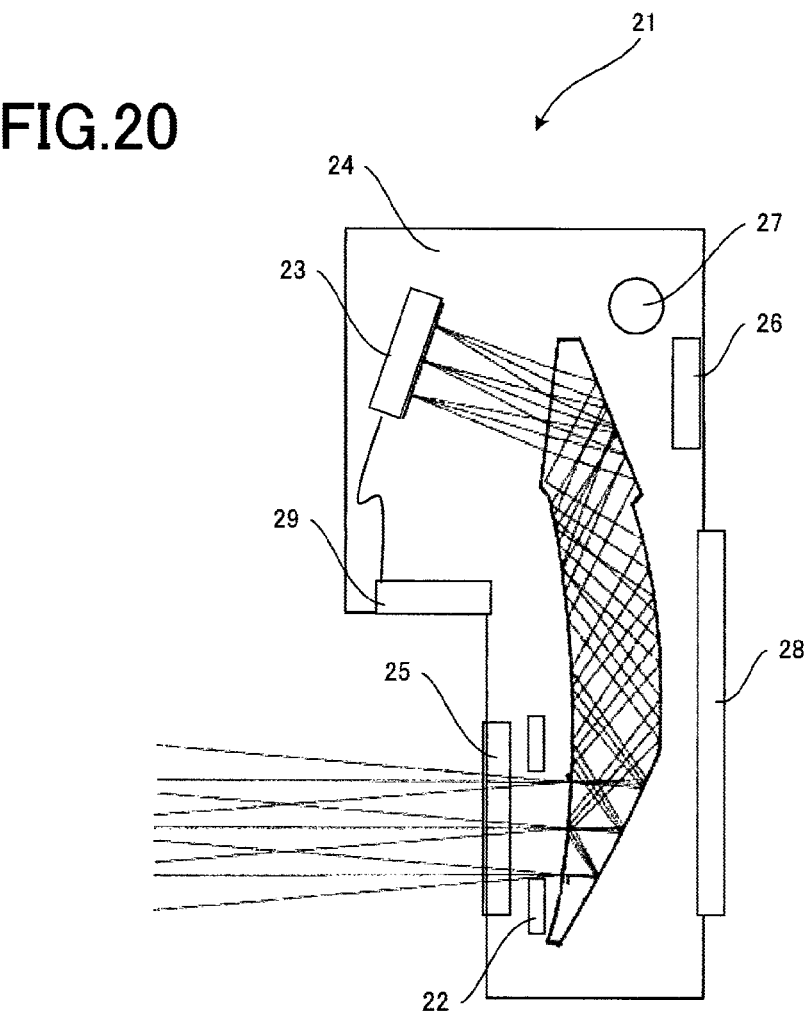
FIG. 20 is illustrative in conception of the prism optical system of the invention when applied to a digital camera that is a typical imaging apparatus.

FIG. 20 is illustrative in conception of the imaging apparatus 21 presented by a digital camera to which the prism optical system 1 disclosed herein is applied. When the inventive prism optical system 1 is applied to the imaging apparatus 21, the exit pupil of the image display apparatus functions as an entrance pupil, and the aperture stop 22 is located near the pupil position. The aperture of the aperture stop 46 is opened wide or narrow for brightness adjustment. Instead of the display device, there is here the imaging device 23 located.

The digital camera body 24 is provided with an entrance window 25 that does just only take light inside but also prevents contamination of the interior, a switch 26, a shutter 27, and a rear panel 28 for checking on operation and the taking of images. As the switch 26 is held on and the shutter 27 is pressed down, it causes a shutter (not shown) affixed to the imaging device 23 to be actuated. Then, still images are taken by the imaging device (CCD) 23 for a time preset at a shutter speed, and image data are loaded up in an image recording memory 29. For the taking of moving images, moving images taken in the imaging device 23 with the shutter held open are loaded up in the image recording memory 29, as is the case with the still images.

The prism optical system as described above comprises a single optical element that is very small in size, light in weight and high in shape flexibility, thereby providing a prism optical system that enables an image at an image display device to be projected as a virtual image onto the viewer s eyeball.

While the present invention has been explained with reference to various embodiments, it is to be understood that the present invention is by no means limited to them, and other embodiments comprising combinations of the requirements and limitations for the invention may fall within the category of the invention too.

What is claimed is:

1. An image display apparatus, comprising:
an image display device, and
a prism optical system that receives light from the image display device and emits the light toward a viewer's eye, wherein:
the prism optical system comprising at least four optical surfaces, wherein:
one of the four optical surfaces is an entrance and transmission surface,
at least two of the four optical surfaces are rotationally asymmetric surfaces,
one of the rotationally asymmetric surfaces being an exit surface and capable of one transmission and two internal reflections, and
the other being an internal reflection surface,
the entrance and transmission surface is an optical surface different from the exit surface and other reflection area,
the image display device is located in opposition to the entrance and transmission surface of the prism optical system, and
an area having internal reflection in the exit surface is in a convex shape on an internal side of the prism optical system and in a concave shape on a viewer side in a plane including a center chief ray.

2. The image display apparatus as recited in claim 1, wherein said display device is located laterally of said viewer, and
a portion of said prism optical system in opposition to a pupil of said viewer has a width of less than 4 mm in a vertical direction.

3. The image display apparatus as recited in claim 2, wherein a light emission area of said prism optical system deviates from a visual axis of the viewer facing the front.

4. The image display apparatus as recited in claim 1, wherein said display device is located laterally of said viewer, and
a portion of said prism optical system in opposition to a pupil of said viewer has a width of greater than 4 mm in a vertical direction.

5. The image display apparatus as recited in claim 4, wherein a light emission area of said prism optical system deviates from a visual axis of the viewer facing the front.

6. An image display apparatus, comprising:
an image display device, and
a prism optical system that receives light from the image display device and emits the light toward a viewer's eye, wherein:
the prism optical system comprising at least five optical surfaces, wherein:
one of the four optical surfaces is an entrance and transmission surface,
at least two of the five optical surfaces are rotationally asymmetric surfaces,
one of the rotationally asymmetric surfaces being an exit surface and capable of one transmission and two internal reflections, and
the other being an internal reflection surface, the entrance and transmission surface is an optical surface different from the exit surface and other reflection area, the image display device is located in opposition to the entrance and transmission surface of the prism optical system, and an area having internal reflection in the exit surface is in a convex shape on an internal side of the prism optical system and in a concave shape on a viewer side in a plane including a center chief ray.

7. The image display apparatus as recited in claim 6, wherein the prism optical system, in order along an optical path taken by light from incidence on the prism optical system until it exits out from the prism optical system, comprises:

a first surface that is a combined entrance and transmission surface, a second surface that is an internal reflection surface located in opposition to the first surface, a third surface that is a combined internal reflection and transmission surface located in opposition to the second surface, a fourth surface that is an internal reflection surface located in opposition to the third surface and adjacent to the second surface, and a fifth surface that is an internal reflection surface located adjacent to the fourth surface and in opposition to the third surface.

8. The image display apparatus as recited in claim 7, wherein at least one reflection at the third surface is total reflection.

9. The image display apparatus as recited in claim 7, wherein the third surface is a rotationally asymmetric surface.

10. The image display apparatus as recited in claim 7, wherein the third surface has negative power in the plane including a center chief ray.

11. The image display apparatus as recited in claim 7, wherein the fourth surface is a rotationally asymmetric surface.

12. The image display apparatus as recited in claim 7, wherein the fifth surface is a rotationally asymmetric surface.

13. The image display apparatus as recited in claim 7, wherein the fifth surface has positive power in the plane including a center chief ray.

14. The image display apparatus as recited in claim 7, wherein the second surface is a rotationally asymmetric surface.

15. The imaging display apparatus as recited in claim 7, wherein an exit pupil is formed near the third surface of the prism optical system or between the third surface and the viewer's eye.

* * * * *